US006789251B1

(12) United States Patent  (10) Patent No.: US 6,789,251 B1
Johnson  (45) Date of Patent: Sep. 7, 2004

(54) SYSTEM AND METHOD FOR MANAGING A SUITE OF DATA MANAGEMENT TOOLS

(75) Inventor: David R. Johnson, Oakdale, MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/362,942

(22) Filed: Jul. 28, 1999

(51) Int. Cl.[7] ................................. G06F 9/44
(52) U.S. Cl. ......................... 717/100; 717/120
(58) Field of Search .............. 717/100–105, 717/120; 707/1–10, 100–104, 200

(56) References Cited

U.S. PATENT DOCUMENTS

| | | | | |
|---|---|---|---|---|
| 6,032,198 | A | * | 2/2000 | Fujii et al. ............... 709/328 |
| 6,170,081 | B1 | * | 1/2001 | Fontana et al. ........... 717/104 |
| 6,199,195 | B1 | * | 3/2001 | Goodwin et al. .......... 717/104 |
| 6,237,143 | B1 | * | 5/2001 | Fontana et al. ........... 717/127 |
| 6,339,838 | B1 | * | 1/2002 | Weinman, Jr. ............ 717/104 |
| 6,574,635 | B2 | * | 6/2003 | Stauber et al. ........ 707/103 R |

OTHER PUBLICATIONS

Neuhaus et al. A Case Study in Repository Selection for a Distributed Software Engineering Environment. IEEE. 1997. pp. 35–41.*

Miguel et al. A Knowledge and Data Base for Software Systems. IEEE. 1990. pp. 417–423.*

Venugopal et al. Requirements of Object–oriented Databases for Tool Integration in IPSE. IEEE. 1991. pp. 543–552.*

* cited by examiner

*Primary Examiner*—Wei Zhen
(74) *Attorney, Agent, or Firm*—Beth L. McMahon; Charles A. Johnson; Mark T. Starr

(57) ABSTRACT

A tool management system and interface for a disparate set of data processing tools is disclosed. A main tool menu allows selected tools to be launched so that each tool populates a respective window. A tool is selected by choosing an associated window as the currently-active window. Next, a list of all data items that are available for processing by the tool set may be obtained. A data item that is to undergo processing may be selected. A user interface provides a list of all operations that may be used to process the selected data item, including those operations that are supported by the currently-selected tool, and those operations that are not supported by the selected tool. Following selection of the operation, processing of the selected data item is completed by automatically invoking the appropriate tool.

27 Claims, 22 Drawing Sheets

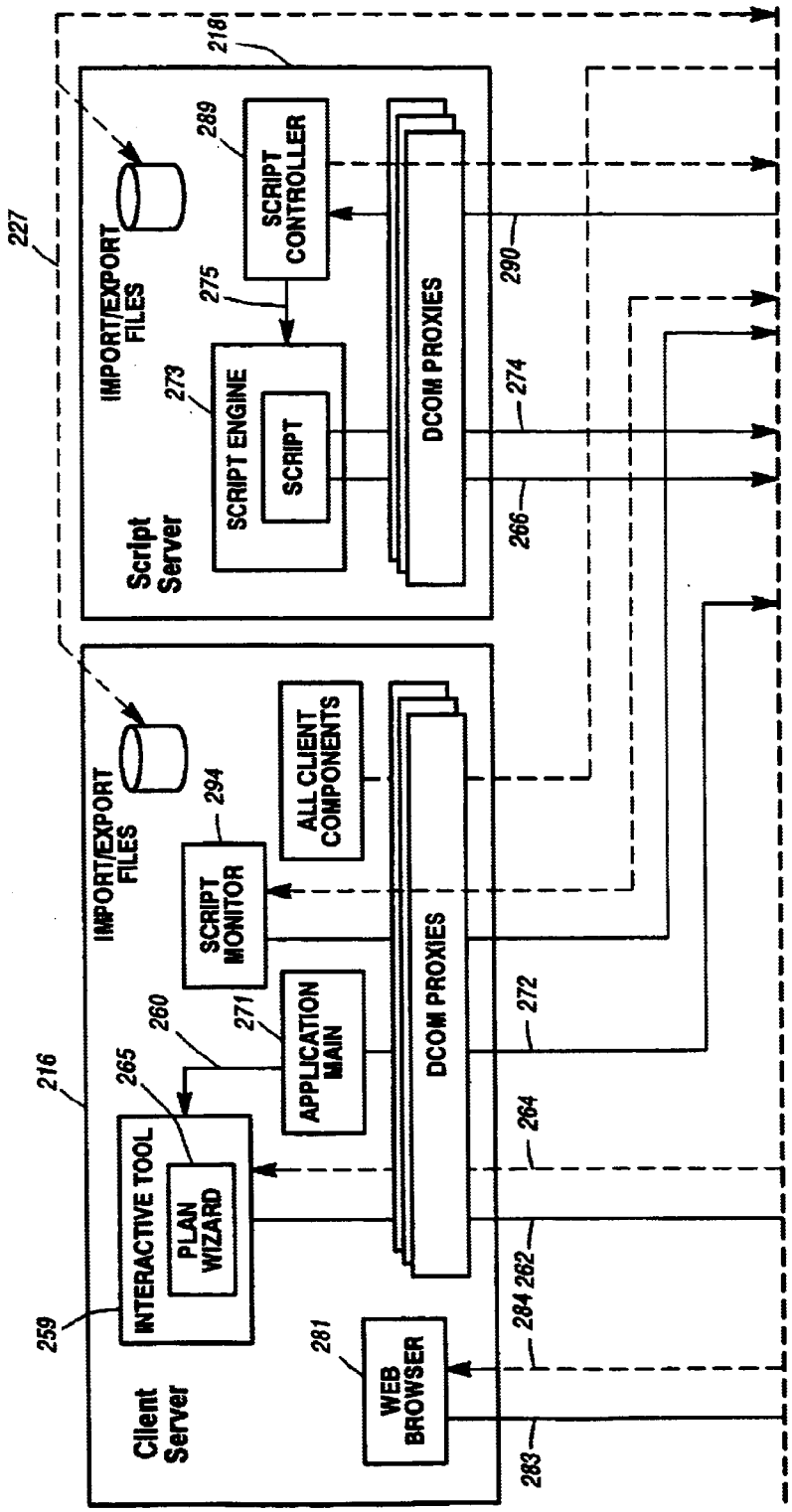

OPERATIONS TABLE

| OP UID (900) | TOOL UID (902) |
|---|---|
|  |  |

Figure 9

TOOL TABLE

| TOOL UID (1100) | ATTRIBUTES (1102) | | |
|---|---|---|---|
|  | 1 | 2 ... | N |

Figure 11

ACTIVE WINDOWS TABLE

| TOOL UID | IINT TOOL CONTROL POINTER | LOGIN CONTROL POINTER | MOST RECENTLY USED (MRU) |
|---|---|---|---|
|  |  |  |  |
| 1300 | 1302 | 1304 | 1306 |

Figure 13

SYSTEM AND METHOD FOR MANAGING A SUITE OF DATA MANAGEMENT TOOLS

CROSS-REFERENCES

This patent application is related to the co-pending U.S. patent application Ser. No. 09/317,414, entitled, "A Process-Driven Tool Interface for an Object Management System", filed on May 24, 1999 by Goiffon et al., which is assigned to the assignee of the present invention, and incorporated herein by reference in its entirety.

This patent application is further related to the co-pending U.S. patent application Ser. No. 09/188,514, entitled, "System and Method for Defining and Managing Reusable Groups of Software Constructs within an Object Management System", now U.S. Pat. No. 6,427,230 filed on Oct. 14, 1998 by Goiffon et al., which is assigned to the assignee of the present invention, and incorporated herein by reference in its entirety.

This patent application is also related to the co-pending U.S. patent application Ser. No. 09/173,095, entitled, "An Object Management System Supporting the Use of Application Domain Knowledge Mapped to Technology Domain Knowledge", now U.S. Pat. No. 6,226,792 filed Oct. 14, 1998 by Goiffon et al., which is assigned to the assignee of the present invention, and incorporated herein by reference in its entirety.

BACKGROUND OF THE INVENTION

1. Field of the Invention

This invention relates generally to an improved tool management system for a data processing system; and, more specifically, relates to a system for managing a disparate set of tools that each performs an associated set of operations for processing data objects stored in a object repository, wherein the user interface provided by any of the tools may be used to select a data object and an operation to be executed to process the selected data object, and wherein the selected operation and data object will be routed to another one of the tools for execution automatically if the selected operation is not included in the set of operations provided by the initially-selected tool.

2. Description of the Prior Art

Today's data processing systems generally include a wide array of software applications and tools for managing, manipulating, creating, cataloging, and searching for data items. A simple example of such a system is the typical personal computer, which may include a first software application adapted for text editing, another application utilized for spread-sheet generation, a third application devoted to the generation of figures and diagrams, and so on. All of these applications may be used at some point to help create a single data item, which in this case may be a document including text, tables, and drawings. To accomplish this, however, the user must first become familiar with each of the tools. The user must also understand which tools are appropriate to accomplish a given task. For instance, a user may be provided a choice between the use of two schematic drawing programs, with the choice being dictated by the data format generated by the programs, and the compatibility of that format with the format used by the other tools. Alternatively, because of specific requirements associated with the data item being processed such as certain formatting requirements, only certain functions provided by a particular application program may be available for use in creating, updating, and/or processing that data item. Gaining this type of knowledge often requires a substantial amount of time and much "trial-and-error" experimentation.

Another disadvantage of using a disparate set of tools to manage or process a single set of data items involves the often disjointed use of the tool set to accomplish the task at hand. In the current example, for instance, a user may be required to use a first tool to perform a first data entry function on a data item. After this operation is completed, the updated data item must be saved, and a second tool is invoked manually to perform a second operation on that data item. This process may be repeated multiple times using multiple tools, resulting in a time-consuming process.

A more complex example of the problems associated with the use of a disparate tool set to process a common set of data items is provided upon considering an object management system of the type described in the co-pending application entitled "An Object Management System Supporting the Use of Application Domain Knowledge Mapped to Technology Domain Knowledge", (hereinafter, "Co-Pending Application") referenced above. This object management system supports the development and management of object-based, reusable code and data modules of the type commonly used in today's software development efforts.

As is known in the art, the object-based coding paradigm relies on the development of a base of reusable code and data modules. Cataloging and providing revision control for these components can be a daunting task. This is especially true because of the rapid pace at which computer technology is evolving. Often it is desirable to adapt software applications and repositories residing on one data processing platform so these applications become available from a different platform. Additionally, it may be desirable to "renovate" certain code and data modules. A common example of such a renovation effort is the adaptation of code to properly handle dates falling after Dec. 31, 1999 to remedy what has become known as the "Y2K problem". Another type of renovation effort is needed to allow for the correct handling of the European Monetary Unit (EMU), or "Euro", which will become the common currency within many European countries within the next few years.

Performing the type of code adaptation and renovation operations described above requires a detailed knowledge of the manner in which the object-based code and data components interrelate. It also requires some way to catalog and track the various revisions of the modules that exist on the system at any given time. The object management system mentioned above provides the ability to catalog the code and data modules and the associated interrelationships in a manner that allows code development tasks to proceed in a much more efficient manner. The details of this object management system are provided in the Co-Pending Application, and in the additional applications cross-referenced above.

The object management system catalogs and tracks code modules and the associated interrelationships by modeling these modules and interrelationships in an object repository. The repository stores objects, wherein ones of the objects referred to as "asset elements" each describes and models a respective code or data module. The repository further stores relationships between the objects that each models the relationships existing between the code and/or data modules modeled by the respective objects.

The objects and object relationships stored in the object repository may be viewed using various element and relationship viewing tools provided by the object management system. Some of these viewing tools allow the user to create, delete, and modify the various objects and object relationships. Other automated analysis tools are used to provide insight into the interdependencies existing between the objects. This knowledge is used to understand the interdependencies existing between the code modules stored within the system. Still other tools are used to develop batch-mode scripts that can be executed to invoke certain processing operations on the objects in the repository, or to perform operations on the code and data modules themselves, as is described in detail in the Co-Pending Application. Tools are also provided to execute these batch-mode scripts.

The various tools used to manage the object repository described above each provides a subset of the functions supported by the object management system. To use this tool set effectively, the user must understand which tool is used to accomplish a given task on a given object. This may not always be intuitively obvious, since some of the tools in the tool set provide similar functions, and the decision to use one tool instead of another is based on the type of object being processed. Additionally, each of the tools provides a user interface that may be dissimilar from the user interfaces provided by other tools. Because of these complexities, a substantial amount of time may be required to gain familiarity with this tool set. Moreover, if a user is processing a given object using a series of tool operations, the user may be required to manually invoke various tools in a manner that is cumbersome and time-consuming.

What is needed is a comprehensive tool management system and interface that hides the complexities associated with a disparate set of object management tools. This tool interface should allow any tool operation to be invoked using any tool interface, regardless of whether the invoked operation is actually supported by the tool used to initially invoke the operation. The tool that actually supports the operation should be automatically launched so that the invoked operation may be performed in a manner that is transparent to the user.

OBJECTS

It is the primary object of this invention to provide an improved tool management system and interface for a data processing system;

It is another object to provide an improved tool interface for an object management system;

It is a further object to provide a tool management system for managing a disparate set of tools used to manage objects stored in an object repository, wherein each of the tools in the set provides an associated set of functions that may be performed on selected objects in the object repository;

It is another object to provide a tool management system for managing a disparate set of data processing tools, wherein any interface of any tool can be used to select an operation to be performed on a selectable data item stored in the system, and wherein a second tool will be automatically invoked to perform the selected operation if the tool used to make the operation selection does not support that operation;

It is a further object to provide a tool management system for allowing a user to specify a desired data processing task to be performed on a data item, and for automatically invoking tools as those tools are needed to accomplish the desired task in a manner that is transparent to the user;

It is another object to manage a disparate set of tools for a data processing system by modeling those tools using objects stored in an object repository;

It is yet another object to manage a disparate set of tools performing a comprehensive set of data processing operations by modeling the operations as objects stored in an object repository;

It is a further object to manage a set of tools in a manner that allows multiple tools to be active simultaneously in respective windows, and wherein the active window as displayed on a user display may be changed automatically in response to user commands to perform a processing task on a selected data item;

It is yet another object to provide a system for managing a disparate set of tools whereby a user is allowed to utilize any tool interface to view a comprehensive set of the data processing operations provided by all tools in the tool set, whereby the data processing operations are available for processing a selected data item;

It is a further object of the invention to manage a disparate set of tools in a manner that allows each tool to be associated with a default operation that may be invoked using a minimal set of key strokes or other selection operations; and It is still another object to manage a disparate set of tools performing a comprehensive set of data processing operations by modeling relationships existing between operations and tools performing those operations as relationships between objects in an object repository.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is a management system and interface for a disparate set of tools used to perform data processing tasks on selected groups of data stored within the system. According to one aspect of the invention, a main tool management program provides a menu that allows a user to initiate the execution of any of the tools. Each of the executing tools is launched in a respective window. At any given time, a user may toggle among the windows using keystrokes or point-and-click device operations to select a window populated with a desired tool. Alternatively, a user may launch a tool from the main tool management program, and the newly-created window populated by the launched tool will become the currently-active window.

After a user selects a tool such that the currently-active window displays the selected tool's interface, the user may further select a task to be performed. This is accomplished by first selecting a data item that is to undergo processing. To facilitate this selection process, each of the tools is provided with a user interface that is capable of displaying a list of predetermined ones of the data items currently stored within the system. The data items included in this list may be files, data objects, meta-data, or any other type of data signal groupings. A series of keystrokes, point-and-click operations, or any other selection mechanism may be used to select the data item that is to become the target of the processing operation.

Next, a user selects the data processing operation that is to be performed on the selected data item. The user interface for the selected tool provides the capability to display a comprehensive list of operations that are available for processing the selected data item. The listed operations include those operations that are supported by the currently-selected tool, as well as those operations that are not supported by that tool.

After the user selects an operation from the displayed operations list, it is determined whether the selected operation is supported by the currently-selected tool. This decision is based, in part, on the type of data item that has been selected. As noted above, according to the preferred embodiment, several tools may be capable of performing similar operations, but each of the tools is designed to perform those operations on different types of data items. Thus the type of data item that is currently selected is used to determine how a selected operation is to be performed. If it is determined that the selected operation is in the set of operations supported by the currently-selected tool, processing of the selected data item is completed. Otherwise, it is determined which of the tools supports the selected operation for the selected data item. Indicators indicative of the selected operation and data item are then routed to the appropriate tool for execution. If the appropriate tool has not yet been launched, a window is opened and populated by the tool, which then performs the selected operation for the selected data item. According to the preferred embodiment, upon the completion of execution for the selected operation, the window for the most-recently invoked tool remains active so that selection of another operation may be performed for the same, or a different, data item.

The tool interfaces and routing function provided by the tool management system allows a user to select an data item to be processed according to a given operation without requiring a user to be familiar with the tools that are available to support a selected data processing operation. Furthermore, the user need not have an understanding of the limitations imposed by a selected data item with regards to the tool selected to perform a given function. Additionally, the user need not have a detailed understanding of the user interface provided by any of the supported tools since operations, once selected, are invoked automatically.

According to another aspect of the invention, the tool management and interface system of the current invention is adapted for use within an object management system used to catalog and track reusable code modules used in software development tasks. The object management system includes an object-based repository that stores objects that each describes and models a respective code or data module. The repository further stores relationships between the objects that each models the relationships existing between the code and/or data modules modeled by the respective objects. The tool management system of the preferred embodiment manages the tool suite provided to manage the objects and object relationships stored in the object repository, wherein the objects are the data items being manipulated by the various operations supported by the tool suite.

In the preferred embodiment of the invention, each of the tools and operations supported by the object management system are modeled as objects in the repository in a manner that is similar to the way in which the code and data modules are modeled in the repository. Relationships are stored in the repository between various ones of the code and data objects and ones of the objects modeling the operations. These relationships provide an indication of those operations that may be performed on the related code and data objects, and are used to generate the operation selection menus provided after the selection of a data item. Likewise, relationships associate each of the objects representing operations with a respective one of the objects representing a tool. These relationships indicate the subset of operations supported by a given tool, and are used in performing the tool routing operations.

According to another aspect of the invention, a default operation may be associated with each of the tools. The default operation is executed when a predetermined keystroke sequence or point-and-click operation is performed while the associated tool is displayed in the currently-active window.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIGS. 2A and 2B, when arranged as shown in FIG. 2, are a block diagram of the preferred embodiment of the Object Manager System within which the current invention operates;

FIG. 9 is the Operations Table;

FIG. 11 is the Attributes Table;

FIG. 13 is the Active Windows Table;

FIG. 15 is a combination of FIGS. 15A & 15B.

FIG. 16 is a combination of FIGS. 16A & 16B.

FIG. 16 and 16B are a flowchart of the method used by Application Main to route operations between various ones of the Interactive Tools;

FIG. 20 is a combination of FIGS. 20A & 20B.

DETAILED DESCRIPTION OF THE PREFERRED EMBODIMENTS

Functional Components of the Object Management System

Figure 1:
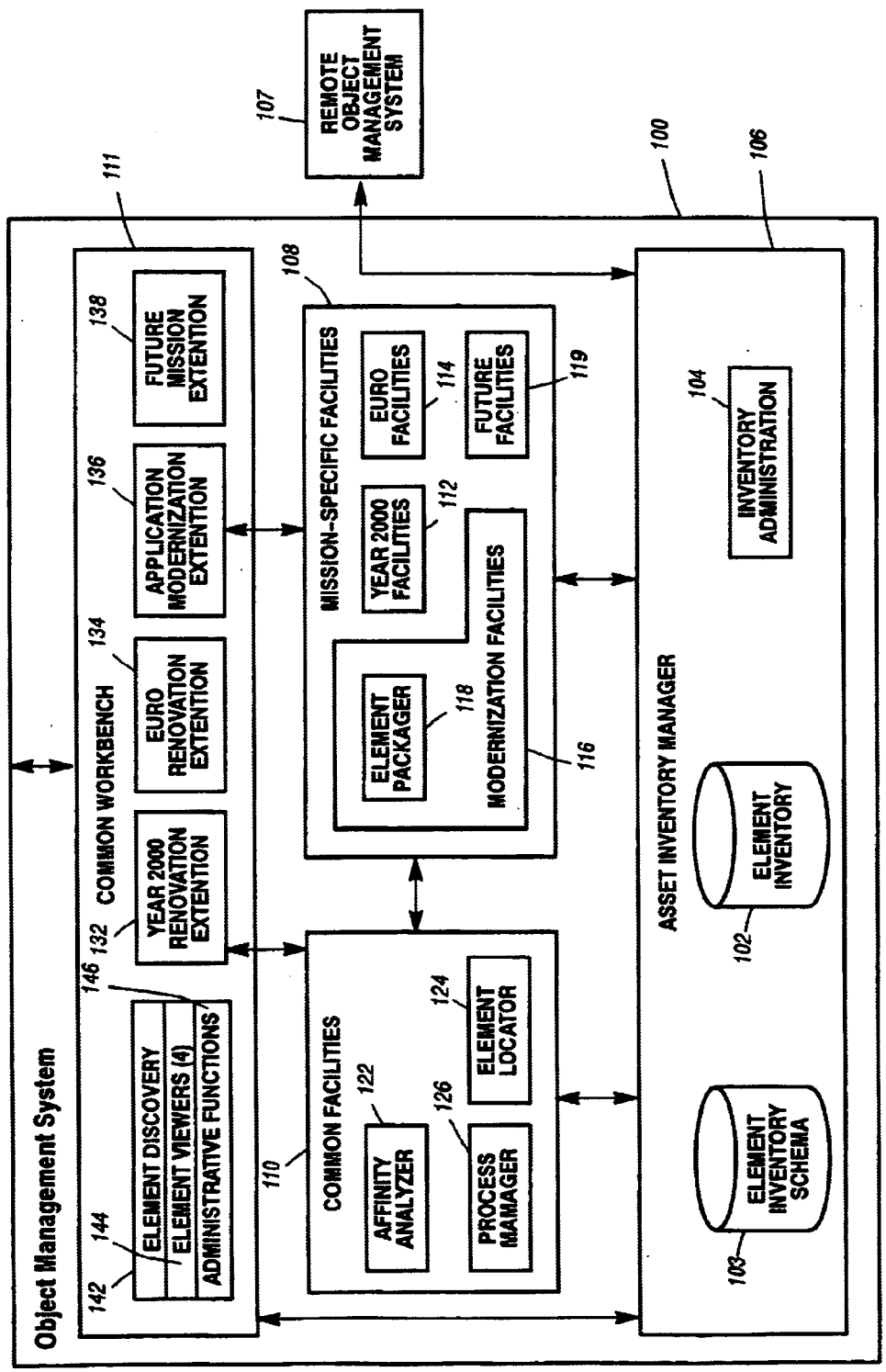
FIG. 1 is a block diagram of the major functional components of the Object Management System within which the current invention operates.

FIG. 1 is a block diagram of the major functional components of the Object Management System 100 within which the current invention operates. The system includes Element Inventory 102, which stores the various objects, or "elements", that are used to manage the code and data components (not shown in FIG. 1) that support an enterprise. Each of the objects stores meta-data, or "data about data". This meta-data describes, among other things, the location of, and the type of, data or code that is stored within the respective component or module residing elsewhere within the system. This meta-data also describes the various relationships that the respective data or code module has with other data and/or code modules. In this manner, the Element Inventory 102 serves as an index which points to, and describes, the various data and code resources used to perform the functions of the particular Information Technology (IT) platform which utilizes the Object Management System 100. This index provides a mechanism which allows a very large body of reusable code and data components to be readily managed using automated tools, and further provides users with an efficient means of understanding the complex relationships and interdependencies existing between the code and data components.

The Element Inventory 102 may also include objects, or elements, that contain meta-data that describes the protocols, processes, plans, and tools used within the Object Management System, as will be described in detail below.

According to the preferred embodiment, each element within the Element Inventory 102 is associated with a respective pre-defined element type. Examples of element types may include "Table", "TableColumn", or "Program". These element types are stored in the Element Inventory Schema (EIS) 103. The element type associated with a particular element is representative of the functionality of the associated data, code or system component. EIS further stores relationship types, which define how one element type is related to another element type. This will be discussed further below.

The Element Inventory 102 is supported using functions provided by Inventory Administration 104. These support functions include the backup facilities used to make a copy of selected elements, and restore facilities used to restore an existing saved copy of an element to the Element Inventory. The administration functions further include export and import operations provided to exchange information between the Element Inventories of one or more remote Object Management Systems such as that shown as Remote Object Management System 107. The export function provides a copy of an element to the remote system, whereas the import function receives a copy of an element from a remote system, and stores the copy within the Element Inventory 102. Export/import exchanges are accomplished using self-defining intermediate file structures of the type utilized by various export/import standards such as extended Markup Language (XML).

Inventory Administration 104 further includes an archive function. This function is similar to the export operation in that it creates a self-defining intermediate file. Unlike the export function, which allows a copy of an exported element to remain within the Element Inventory 102, the archive function deletes an element from the Element Inventory while retaining an archived record of the element for possible later use.

The Inventory Administration 104 also supports a Migration Function. This function is utilized to copy an element and the corresponding inventory information pertaining to that element between multiple Object Management Systems that are at different release levels.

The Element Inventory 102 and Inventory Administration 104 are managed by the Asset Inventory Manager 106. The Asset Inventory Manager (AIM) is the software that provides an interface to the Element Inventory 102 and Element Inventory Schema 103. One of the functions of the AIM is to hide the underlying repository implementation by providing an Application Program Interface (API) tailored for elements. The AIM provides an interface that supports the operations required by both the Mission Specific Facilities, shown in Block 108, and the Common Facilities, shown in Block 110.

The types of Mission-Specific Facilities shown in Block 108 may vary between Object Management Systems as required by the needs of the users. These include the renovation, transformation, and development tools that are used to adapt existing software to changing user requirements. When tools are installed, they are registered in the Element Inventory 102. That is, for each tool, one or more elements are created that define each of the tools, and that define the types of relationships these tools may have with other code and/or data constructs within the system. Thus, the tools that are used by the Object Management System are inventoried in a similar manner to all other code and data constructs within the system.

New versions of tools may be installed over time. When this occurs, updated versions of the associated elements are also created and interrelated. The relationship between a version of a tool and code and/or data elements that may be created by the tool are also recorded in the Element Inventory. Tool administration functions are performed using the graphical user interface associated with the Common Workbench 111 to be discussed below.

FIG. 1 illustrates some of the Mission-Specific Facilities, or tools, that will be commonly provided by the Object Management System 100 of the preferred embodiment, including the Year 2000 Facilities 112, the Euro Facilities 114, and the Modernization Facilities 116. The Year 2000 Facilities 112 contain the user interfaces and tools required to support analysis and renovation of applications to be ready for the year 2000. Euro Facilities 114 include the user interfaces and tools required to convert business applications into code which handles the new European Monetary Unit (Euro). Modernization Facilities involves the user interfaces and tools required to integrate new applications with existing applications and/or to re-implement all or parts of existing applications within different systems and platforms, or using different software technologies.

Each of the Mission-Specific Facilities will generally be invoked on a group of related code and data components. To locate the related code and data components on which these Mission-Specific Facilities may be invoked, some type of element identification function must be invoked using the relationships defined within Element Inventory 102 as will be discussed below.

After a group of code or data components has been identified as the target of some type of renovation or transformation operation, Element Packager 118 is utilized to build the identified elements into a package that includes all of the code and data necessary to transform the group of components. To perform this function, the Element Packager must extract additional information about each of the elements from Element Inventory 102.

After element packaging is completed, the Modernization Facilities 116 are used to perform some type of transformation operation on the element package. This may be accomplished by either wrapping all, or part, of an existing element package with layers of software called a "wrapper" that provide an interface bridge between the wrapped elements that makes that package accessible from a different operating environment. Alternatively, some of the elements in the package may be entirely re-implemented using a new technology.

The Mission-Specific Facilities shown in FIG. 1 are exemplary only. Still other types of tools could be included within the current Object Management System 100, including, but not limited to, facilities to migrate software to platforms having a different word size or address-space size. These are represented by Future Facilities 119.

Object Management System 100 further includes Common Facilities 110. These functions aid the user in understanding the relationships between elements, and also aid in invoking the tools used to perform the transformation and renovation operations. Common Facilities 110 include the Affinity Analyzer 122, which is a tool that analyzes the relationships existing between various elements contained within the Element Inventory 102. For example, the Affinity Analyzer determines which elements are involved in the processing performed to accomplish a particular function. The Affinity Analyzer 122 further provides a graphic display representing the various elements and element relationships for those code and data components provided by the IT platform. The graphical displays, which are capable of illustrating complex element networks, are used for advanced impact analysis and element packaging purposes. For example, before a particular code module is modified, the relationships existing between the associated element that models that code module and other elements may be used to determine which other code or data components need to be modified to maintain compatibility. These relationships may be graphically depicted using the Affinity Analyzer 122. The Affinity Analyzer allows software analysts to interrogate and visually mine single or disparate sets of elements without having to understand the details of the elements or relationships. Query and exploration, hypothesis generation, and knowledge discovery routines eliminate the need to compose complex queries for investigating how various code and data components are structured or interrelate. In the preferred embodiment, the Affinity Analyzer is implemented using the Netmap tool commercially available from the Alta Corporation.

The Common Facilities 110 further comprises the Element Locator 124. This tool uses Natural Language Understanding (NLU) technology to locate potentially reusable elements in the Element Inventory 102. This makes the information stored in the Element Inventory more accessible to other environments since the details of Element Inventory structure do not have to be known from outside the local system. The Element Locator 124 is able to perform a very efficient "concept" search using application domain mappings stored in the Element Inventory 102. The Element Locator 124 is described in detail in the co-pending application entitled "An Object Management System Supporting the Use of Application Domain Knowledge Mapped to Technology Domain Knowledge", referenced above and incorporated herein by reference in its entirety.

Also included in the Common Facilities 110 is the Process Manager 126. The Process Manager is a rules-based tool that allows a user to define objects called protocols and processes that are stored in Element Inventory 102. These objects provide a mechanism whereby a user can invoke scripted tools and certain other functions provided by the Asset Inventory Manager 100 without being familiar with the actual tool interfaces associated with the tool invocation. Using these objects, a user can invoke scripted tools by specifying a desired outcome instead of by specifying particular tool sequences. Thus the complexity associated with locating, transforming, processing, and managing the code and data modules of an IT department is largely hidden from the user. Moreover, because protocol and processes are defined and managed as objects, the impact-analysis operations that must be performed when tools, code modules, or data modules are modified or deleted is largely simplified. This reduces development and training times, and further makes complex tasks less error-prone. The use of protocols and processes will be discussed in detail below.

A user accesses both Common Facilities 110 and the Mission-Specific Facilities 108 through a graphical user interface represented on FIG. 1 as the Common Workbench (Workbench) 111. In the preferred embodiment, Object Management System 100 is a web-based system having a "web-like" interface, although other types of interfaces, graphical or non-graphical, could be utilized. The Workbench 111 is shown providing selections for Year 2000 Renovation 132, Euro Renovation 134, Application Modernization 136, and any other additional future extension, shown as Future Mission Extension 138, that may be needed.

Also included in the Workbench 111 are functions that allow the user to manage, view, and report on the elements and element relationships existing within the Element Inventory 102. These tools include Element Discovery Functions 142. Element discovery refers to the process of initially creating elements and the relationships among elements in the Element Inventory. Generally, an Element Discovery Function will analyze a target group of software and data constructs and the interrelationships between these constructs. The Element Discovery Function will then automatically create elements associated with the code and data constructs. If the Object Management System is model driven, the Element Discovery Function 142 will utilize the various element type definitions stored within the model, for example, "program" or "database", to create the elements. As discussed above, each of these elements includes meta-data that describes the location and function of the associated code or data element. This meta-data will further describe the relationships that an element has with other elements, wherein each element relationship models the relationship between the associated code or data construct and other code or data constructs represented by the related elements. The Element Discovery Function will generally create a group of elements that may then be stored within the Element Inventory 102, and which then becomes available as part of the system knowledge base to manage the associated code and data components.

A wide variety of vendor tools are available to perform Element Discovery Functions 142. For example, the Fulcrum tool commercially available from the RMC Corporation is capable of analyzing Cobol code constructs and related data structures. This tool must be synchronized with the element types included within a model and stored within the Element Inventory Schema 103. This synchronization allows Fulcrum to create elements having recognized element types and relationship types, and that are consistent with other element types used within the system. Many other types of tools are available for analyzing code and data constructs of various other types of software languages. The type of Element Discovery Functions 142 that are available within a given Object Management System 100 will vary depending on the types of IT functions and technologies that are supported by that system.

Once elements and element relationships are created and recorded within the Element Inventory 102, the related code and data entities can be managed, and become available as potential building blocks to form larger applications. Element Locator 124 can be used to locate groups of elements associated with a particular application or applications so that one or more of the Mission-Specific Facilities can be performed on the element group. The identified elements may then be provided to the Element Packager 118 to be packaged prior to being operated on by the Modernization Facilities 116 in the manner discussed above. Element Locator 124 operates using the technology and application domain mappings that will be described in detail below.

The system further includes several element view functions shown collectively as Element Viewers 144. Element Viewers allow a user to see the elements and element relationships that are stored within Element Inventory 102, and in some cases may be used to create new relationships between existing elements. Four main view tools, or "views", are provided by the Element Viewers 144. The first tool, which provides the default view of Object Management System 100, is the Element Explorer. This tool allows a user to explore the contents and hierarchical structure of Element Inventory 102 and EIS 103 in a manner that is similar to the operation of well-known directory and file exploration tools. Element Explorer allows a user to specify a particular element type as defined within the EIS 103, and in response, provides a list of all of the elements stored within the Element Inventory 102 that are of the type specified. This view further allows a user to create a new element using a selected element type. When a new element is created, memory is allocated within Element Inventory 102. The user can then manually enter the meta-data that will be stored in the new element. For example, the user may enter the location of the associated code, data, or system component, and may manually enter the relationship information that will relate the newly-created element to other elements. The functions of Element Explorer will be discussed further below.

Another viewing tool included in Element Viewers 144 is the Relationship Explorer that provides information about relationship types and specific relationships that exist in the EIS 103 and Element Inventory 102, respectively. The other tools include Properties Viewer and Affinity Viewer. The Properties View enables the user to view the list of attributes associated with a selected element or element type, and which are stored within the Element Inventory 102. Attributes provide additional information about the code and data module associated with, and described by, the selected element, as will be described further below. The Relationships View is a graphic illustration of the relationships existing between a selected element and other elements, or between a selected element type and other element types. This view further allows a user to create new relationships for that element. This will be described further below. In comparison to the Relationships View, the Affinity View provides a more distant view of a chain of related elements. The Affinity View takes as input a user-provided starting element or element type and an ending element or element type, and displays the starting element, the ending element, and all elements and element relationships which provide the chain, or "slice" of interconnections leading from the starting element to the ending element. A similar view is provided between a specified starting element type and a specified ending element type. The relationships which are provided in these views represent relationships between software constructs that are managed by the Object Management System.

Object Management System further includes Relationship Explorer 145. Relationship Explorer is similar to the Element Explorer of Element Viewers 144. This tool allows users to view element types and elements defined within EIS 103 and Element Inventory 102, respectively, as the element types and elements exist within a hierarchical relationship tree.

Workbench 111 further provides Administration Functions 146 to administer the Element Inventory.

Object Management System Subsystems and Interfaces

Figure 2B:
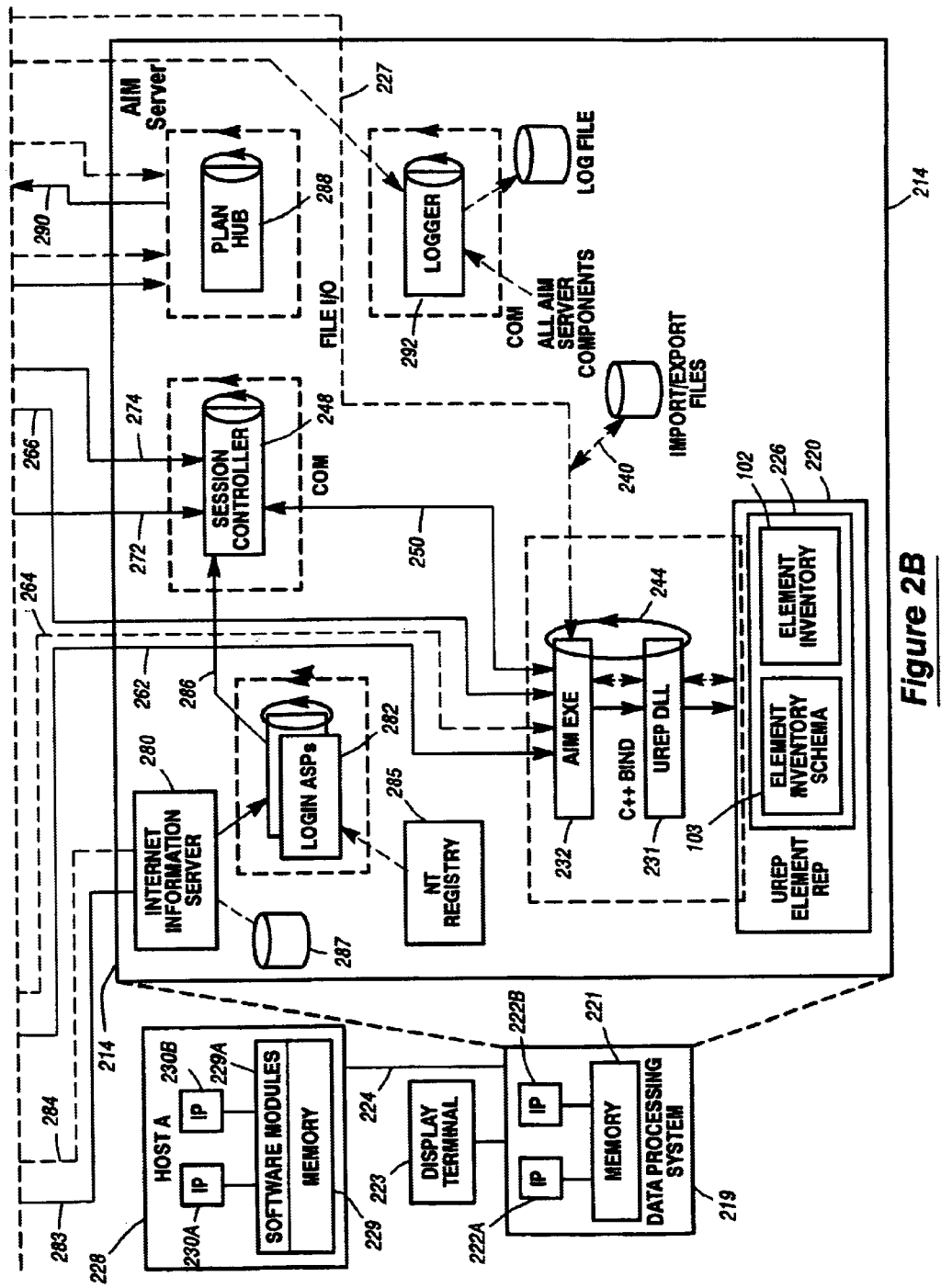

FIGS. 2A and 2B, when arranged as shown in FIG. 2, are a block diagram of the preferred embodiment of the Object Management System within which the current invention operates. In this diagram, process control flow is represented by a solid arrow, and data flow is represented by a dashed arrow, as shown by control flow indicator 202 and data flow indicator 204, respectively. It may be noted that in FIG. 2, any of the dashed arrows representing data flow indicators are implemented as network interconnections. A dashed box with an arrow represents a process, and a dashed box with a double arrow represents a replicated process, as shown by process and replicated process indicators 206 and 208, respectively. A solid loop with an arrow represents a thread, and a solid loop with a double arrow represents a replicated thread, as shown by thread and replicated thread indicators 210 and 212, respectively.

The functionality embodied within Object Management System can be physically divided into three servers, the Asset Inventory Manager (AIM) Server 214, the Client Server 216, and the Script Server 218. The AIM Server 214 supports the Element Inventory 102, Inventory Administration 104, the Asset Inventory Manager 106, the Mission-Specific Facilities 108, and the Common Facilities 110 shown in FIG. 1. The Client Server provides the user interface to AIM Server 214, and supports the Common Workbench 111 of FIG. 1. Finally, the Script Server 218 supports execution of various scripts that are used to execute the scripted protocols, processes, and plans described above in reference to Process Manager 126.

The software constructs shown as AIM Server 214 reside on a data processing system such as that shown in FIG. 2 as Data Processing System 219. Data Processing System 219 includes Memory 221 intercoupled to one or more Instruction Processors (IPs) shown as IP 222A and IP 222B. Data Processing System 219 has one or more user interfaces such as Display Terminal 223. Client Server 216 and Script Server 218 may reside on the same Data Processing System 219, or on similar data processing systems (not shown) intercoupled to Data Processing System 219 via network interconnections. If multiple data processing systems are utilized, each of the similar data processing systems include storage units and IPs in a manner that is similar to that shown for Data Processing System 219. In an alternatively embodiment, Object Management System has multiple Client Servers 216 and multiple Script Servers 218.

The AIM Server

AIM Server 214 includes Element Repository (ER) 220, which is the repository that stores and manages persistent objects (elements). ER 220 may be implemented across multiple hosts interconnected by a remote interface. In the preferred embodiment shown in FIG. 2, the ER is implemented using the Unisys Universal Repository (UREP) commercially available from the Unisys Corporation, although other types of repositories could be utilized including, but not limited to, a Microsoft Repository commercially available from the Microsoft Corporation. Unisys Universal Repository (UREP) is a fully object-oriented repository for providing access to, concurrent sharing of, and immediate update support of all objects stored within the repository. For more information on the UREP system from Unisys, see the UREP Technical Overview, Document Number 8807 6971-000 available from the Unisys Corporation, and which is incorporated herein by reference in its entirety.

In the preferred embodiment, the Element Repository 220 is loaded with the Element Repository Model (ERM) 226. The ERM is an object model which defines objects within ER 220 used to store the element types, relationship types, elements, and relationships.

Within the ERM, the model that defines the various element types is called the Element Inventory Schema (EIS) 103, as discussed above. This model is installed in the Element Repository at system installation time, but may be varied throughout the life of the system. The model definition may be specific to a particular Object Management System. The Element type definitions within EIS 103 provide the templates used during element creation, and define the type of information contained in, the attributes associated with, and the relationships existing between, the elements.

In addition to the EIS, the ERM further contains the Element Inventory 102. The Element Inventory, which is discussed above in reference to FIG. 1, is the collection of elements, each of which is an object storing meta-data about other code, data, or system entities residing elsewhere. This meta-data describes, either directly or indirectly, where the respective entity resides (for example, which directory and server stores the entity). It may be remembered that numerous network interconnections exist within the current Object Management System, and each are depicted by an instance of data flow indicators 204. Any of these network interconnections may interface to another server storing code, data, or system modules represented by the elements stored in Element Inventory 102. For example, FIG. 2 shows a network interconnection represented by Line 224 connecting a Host A 228 to Data Processing System 219. Host A 228 includes Memory 229 which stores code and data modules shown as Software Modules 229A. Memory 229 is interconnected to one or more IPs shown as IP 230A and IP230B for executing instructions, and for aiding in the development of, and the execution of, any of the code and/or data modules. Multiple hosts of the type represented by Host A 228 may be interconnected to Object Management System 100 so that data, code or system modules developed and stored on the host may be managed and cataloged by Object Management System. Alternatively, a host such as Host A 228 that is managed by Object Management System 100 need not be interconnected to Object Management System 100. In that case, any information exchange being conducted between the two systems would occur via a tangible medium (such as by tapes.) The meta-data included in each of the elements of Element Inventory 102 further describes the relationships an element has with other elements. As discussed above, these relationships model the relationships the associated data, code or system module has with other modules. In the preferred embodiment, the types of meta-data stored within a particular element, as well as the types of relationships that may be created for a particular element, are dictated by the element type associated with the element. The definitions for element types are stored within the model in the EIS 103. This is discussed in detail below.

The Element Repository is accessed using the UREP Dynamic Link Library (DLL) 231. This DLL provides programmatic access to objects stored in ER 220, including objects of ERM 226.

The UREP DLL 231 interfaces with the Asset Inventory Manager Executable (AIM EXE) 232. The AIM EXE implements the Asset Inventory Manager 106 function of FIG. 1. As discussed above, one of the functions of the AIM EXE 232 is to provide an interface to the Element Repository 220 that hides the underlying repository implementation. For example, the services provided by the AIM EXE hide the functions provided by the UREP DLL 231. The AIM EXE further masks the user from any transaction management and database locking that is required to accomplish a given task. The AIM EXE does so by providing an Application Program Interface (API) that supports the operations required by the entities accessing the various elements stored within the Element Inventory 102.

The following services are provided by the AIM EXE. Various ones of these services are called by the Element Discovery Functions 142, and Element Viewers 144 to perform the tasks discussed above. Additionally, various ones of these services may be invoked by a script executing on the script server, wherein the script is formed using protocols, processes, and plans in a manner to be discussed below. In this case, the AIM EXE responds as one of the scripted tools to be discussed in reference to the detailed description of the invention.

Connect:

This service connects the session to the Element Repository. This service further opens the repository, makes a repository log entry in the newly created object, and begins a UREP session.

Disconnect:

This service disconnects the session from the Element Repository. In the preferred embodiment, this is accomplished by ending the UREP session and closing the repository. This service is called with a parameter that indicates whether uncommitted changes should be discarded. If uncommitted changes exist which are not to be discarded, the request for this service is disregarded.

Export Element Types:

This service reads element types from the EIS 103 and writes them into a file in a predetermined format as shown by dashed line 227. In the preferred embodiment, this format is XML. This service is called by scripts which execute on the Script Server 218.

Import Element Types:

This service reads element types from a file and writes them into the EIS 103 in a predetermined format, which in the preferred embodiment is XML format, and is shown by dashed line 227. This service is called by scripts that execute on the Script Server 218. The element types are installed at initialization time, and may be updated as desired during the life of a system.

Get Element Types:

This service reads element types from the EIS 103 and returns them to the caller in an output parameter. In the preferred embodiment, the output format is XML.

Put Element Types:

This service reads element types from an input parameter and writes them to the EIS 103. In the preferred embodiment, the input format is XML.

Export Elements:

This service reads elements from the Element Inventory 102 and writes them into a file as is indicated by dashed line 240. This service is called by scripts executing on either the Client Server 216 or the Script Server 218.

Import Elements:

A service which reads elements from a file and writes them into the Element Inventory 102 as indicated by dashed line 240. This service includes options for handling already-existing elements, including the Ignore, Overwrite, and Create New Version options. This service is called by scripts executing on either the Client Server 216 or the Script Server 218.

Get Elements:

A service that reads elements from the Element Inventory 102 and returns them to the caller in an output parameter. This service is called by various ones of the Interactive Tools 259. The element that is to be retrieved may be specified according to an element name, or may be specified using relationship data used to address a particular element within the Element Inventory. Another option for this service allows an element to be specified for retrieval according to a particular character string that the element stores. This can be invoked via a script call.

Get Element for Update:

A service called by various ones of the Interactive Tools. This service sets an update lock on an element for a particular session, then reads the selected element from the Element Inventory 102 so that it is returned to the requester as an output parameter. The selected element may be specified by element name, or may be specified using relationship data used to address an element within the Element Inventory. Another option allows the selected element to be specified according to particular character string that the element stores.

Create Elements:

A service called by the Interactive Tools, and that provides elements as input parameters so that they can be written to the Element Inventory 102. This can be invoked via a script call.

Update Element:

A service called by the Interactive Tools 259 for providing elements as input parameters so that they can be written to the Element Inventory 102. This service must be preceded by a call to "Get Element for Update" service.

Delete Elements:

A service called by the Interactive Tools 259 that deletes specified elements from the Element Inventory 102.

Get BLOB:

A service called by Interactive Tools 259 which reads a Binary Large Object (BLOB) attribute from an Element in the Element Inventory 102 and writes it into a file. The file can reside on a remote host, specified by a Universal Naming Convention (UNC) name.

Get BLOB for Update:

A service called by Interactive Tools which sets an update lock for this session on a BLOB Element in the Element Inventory 102, reads its BLOB attribute, and writes the BLOB attribute into a file. The file can be on a remote host, specified by UNC name.

Update BLOB:

This service, which is called by the Interactive Tools, reads a BLOB from a file, and writes the BLOB as an attribute of a BLOB Element in the Element Repository 102. The file can be on a remote host, specified by UNC name. This service call must be preceded by Get BLOB for Update.

Save:

A service which commits all uncommitted changes to the Element Inventory 102. When invoked from interactive session, this service also saves a description of the state of the Common Workbench 111, including the state for any executing Interactive Tools.

Undo Last:

A service that rolls back the last uncommitted change to the Element Inventory 102. This service may be called by either Interactive Tools 259 or by scripts.

Undo All:

This service rolls back all uncommitted changes to the Inventory, if any such uncommitted changes exist. This service may be called by either the Interactive Tools 259 or scripts.

An instance of the AIM EXE 232 is created for each session that is active on the AIM server. If multiple sessions are active, multiple instances of the AIM EXE will be active at once. This is indicated by the replicated process indicator 244.

Creation of the AIM EXE 232 is performed by the Session Controller 248 as is indicated by control flow indicator 250. Creation of the AIM EXE invokes the "Connect" service to establish a session with the Element Repository 220. A session is ended when the Session Controller 248 calls the AIM EXE "Disconnect" service.

In the preferred embodiment, the Session Controller 248 is an NT service that is started automatically at AIM Server boot-up or manually by the administrator. The Session Controller is responsible for generating begin and end session requests in response to user requests received from Application Main 271 to log in and log off the Object Management System, respectively. These requests are represented by control flow indicator 272. Such requests may also be received by the Session Controller 248 from script execution on Script Engine 273, as shown by control flow indicator 274. The Session Controller is also responsible for receiving administrator requests to terminate orphaned sessions by destroying orphaned COM objects.

The browser-level client interface to AIM Server 214 is provided by the Internet Information Server (IIS) 280. In the preferred embodiment, IIS 280 responds to requests from Web Browser 281 by delivering login Active Server Pages (ASPs) 282 to the user for allowing login functions to be performed. The requests are represented by control flow indicator 283, and the IIS responses are represented by data flow indicator 284. IIS returns an HTML page which displays the names of the Object Management Systems if more than one system is available to the user, and further directs the user to the URL of the selected login form ASP. The URLs for the login form ASP is obtained from NT Registry 285, which stores system persistent data such as system names and ASP URLs that cannot, or should not, be held in the Element Repository 220.

A login form ASP returns an HTML page to the client. This ASP contains a form in which the user enters login information such as a user id and password. The user is then directed to the Login Request ASP, which sends the entered information to the Session Controller 248 for validation, as shown by control flow indicator 286. If a session is not successfully created for the user, an HTML page is returned to the client requesting that the information be reentered. Otherwise, a session is established.

Once a user is logged in, the client-side application files for the Object Management System are downloaded from Mass Storage 287 to the Client Server 216, and Application Main 271 on Client Server begins execution. Thereafter, further communication between Client 216 and AIM Server 214 is performed via the Session Controller 248 using Distributed Component Object Module (DCOM) protocol, as shown by control flow indicator 272.

The AIM Server 214 further includes Plan Hub 288, which acts as a central router for script execution requests and script execution status. The Plan Hub receives requests for script execution from the Client Server 216, and forwards these requests to a specified Script Controller 289, which is the process executing on Script Server 218. These requests are represented by control flow indicator 290. As an NT service, the Plan Hub process is started automatically when the AIM Server is booted, and may also be started manually by a system administrator.

AIM Server 214 also includes Logger 292, which is an NT service that receives script execution status from Script Controller 289 so that this status can be recorded.

Client Server

As discussed above the Client Server may be implemented on the same Data Processing System 219 as shown in FIG. 2, or may be implemented on a similar system that includes memory and at least one IP. Using Client Server, a user establishes a session with the AIM Server by invoking the URLs of Login ASPs using Web Browser 281. The user receives HTML login pages and application files from IIS 280. Once a user is logged in and a session is established for the user, communication between client and server is via DCOM, although the browser session is maintained.

Application Main 271 is the main client-side process supporting the object management functions. As an executable, the process for Application Main is started at creation. Application Main provides for the start-up of the individual Interactive Tools 259 via the interface shown as Line 260. Application Main further has access to ones of the global services such as Save, Undo, and Logoff, which are provided by the AIM EXE 232.

Invocation of Interactive Tools 259 by Application Main starts each of the Interactive Tools at its logical starting point. These tools call services provided by the AIM EXE to perform functions such as retrieving element type definitions from the EIS 103, retrieving element data from the Element Inventory 102, making requests for the creation of new elements according to the EIS model, or making requests to modify existing elements. These requests are shown in FIG. 2 as Control Flow Indicator 262 and Data Flow Indicator 264. A new thread is started when one of the Interactive Tools 259 begins communicating with the AIM EXE 232. When a request from Interactive Tools 259 is processed successfully by AIM EXE, notification of changes to data in the ER 220 is returned by the AIM EXE 232 via Session Controller 248 to Application Main 271, which then forwards the notification to Interactive Tools 259 via the interface shown as Line 260. One of the Interactive Tools to be described in more detail below is the Plan Wizard 265.

Script Server

The AIM EXE 232 further communicates with Script Server 218. Within Script Server 218, Script Controller 289 accepts requests from the Plan Hub 288 to execute a Plan such that a scripted tool will be programmatically invoked, as will be described in detail below. In response, the Script Controller reads a requested scripted plan, which is stored as an element in the Element Inventory 102. Thereafter, Script Controller controls execution of the scripted plan by Script Engine 273, as indicated by Line 275. The Script Controller further sends periodic notifications to the Plan Hub 288 to report on the script execution status. Upon termination of the script, the Plan Hub writes an element that is a Plan Execution Record to the Element Inventory 102 which records the completion status and includes information necessary for version control.

Structure of the Element Inventory Schema and Element Inventory

Before the use of protocols, processes, and plans can be understood, a brief explanation of the structure of the Element Inventory Schema 103 and the Element Inventory 102 is needed.

Figure 3:
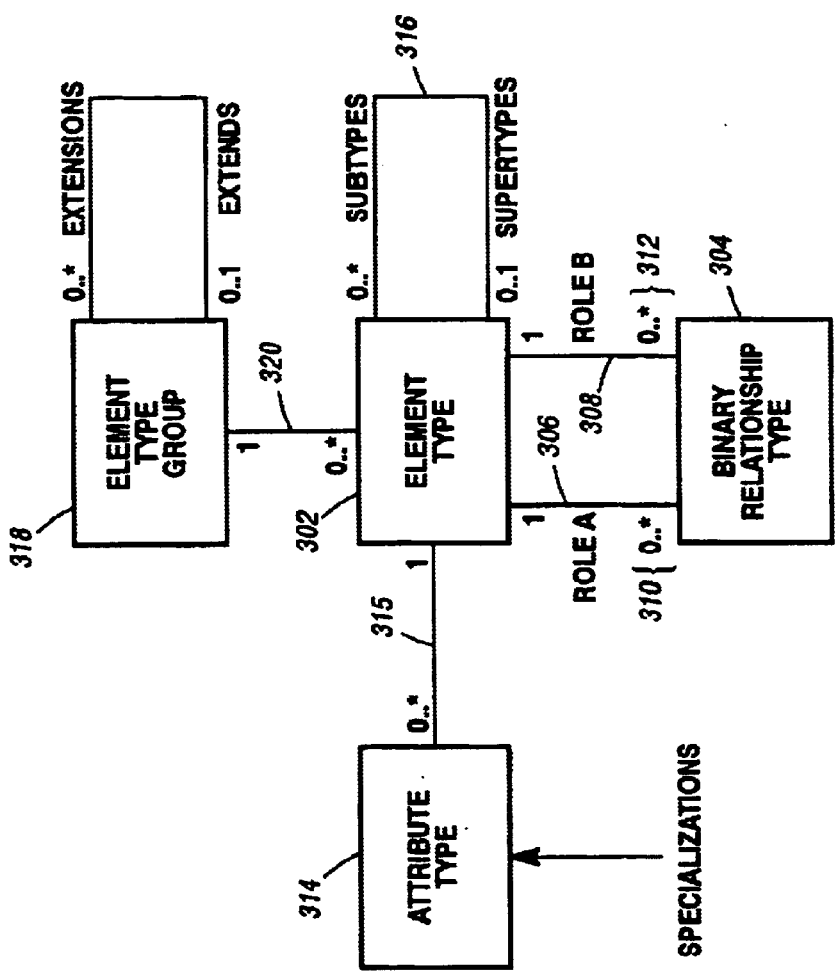
FIG. 3 is a block diagram of the generalized model for the Element Inventory Schema (EIS)

FIG. 3 is a block diagram of the generalized model for the Element Inventory Schema (EIS). As discussed above, the preferred embodiment of the Object Management System 100 utilizes a model loaded within EIS 103 which includes the element type definitions as represented by Element Type 302. Each element type may represent a particular type of software construct or data structure for a code or data module existing within one of the host systems interconnected to Object Management System 100. Examples of element types include "table", "program", "database", "application", and "transaction management system". As many element types may be defined as is necessary to support a given mission of the data processing systems that are managed by Object Management System 100. Generally, a set of element types will be loaded when the Object Management System is initialized. The model is flexible, and may be updated during the life of the system using service calls to the AIM EXE 232 such as "Put Element Types" and "Import Element Types".

Each element type has a predefined Binary Relationship Type 304 with one or more other element types. For example, an element type of "table" has a binary relationship type with an element of type "column". This relationship represents the fact that an element of type "table" may be created within Element Inventory 102 to represent a data module existing on one of the host systems interconnected to the Object Management System 100. The actual table may include one or more columns, and each of these columns will be represented by other elements of type "column" that are also stored in the Element Inventory 102. To restate, each element type 302 represents a type of a potentially reusable code, data, or system module located on various host systems managed by Object Management System 100. The relationship types which exist between element types represent various relationship types that exist between the reusable code, data, and system modules.

In addition to element types that are defined to represent code and data modules, System element types including "protocols", "processes", and "plans" are defined in the EIS 103 for use in supporting the development, deployment, and tracking of scripts used to aid in the management of the elements stored in Element Inventory 102. This will be discussed in detail below.

Returning to the above example, it may be said an element type of "table" has a Binary Relationship Type 304 of "includes" with an element type of "column". Looking at the relationship from another viewpoint, it may be said an element of type "column" is "included by" an element of type "table". Thus "includes" and "included by" defines the roleA and roleB associated with the relationship between table elements and column elements, as is represented by lines 306 and 308, respectively. A given element type may be associated with zero or more relationships of a particular Binary Relationship Type 304. This is indicated by vectors 310 and 312.

An Element Type 302 may each be associated with one or more Attribute Types such as Attribute Type 314, as is represented by Line 315. An Attribute Type is a type of fact that may be stored about an element. "Comment" or "Data type" is an example of attribute types. More than one attribute type may be stored for a given element type.

The element type definitions are hierarchical. A given element type may include element sub-types below it in the element hierarchy, and may be included within an element super-type that is above it in the hierarchy. For example, an element type "Information System Tool" could include sub-types such as "compiler". Element super-types for "Information System Tool" could be "Tool" generally. Element types each inherits the defined attribute types associated with the super-type immediately above it in the hierarchy. This includes the ability to form the relationship types that the super-type was capable of forming. The definitional hierarchy implemented by subtypes and super-types is represented by line 316.

Multiple element types may be grouped into categories, each of which is referred to as an Element Type Group 318. This grouping is represented by line 320. In the preferred embodiment, three Element Type Groups exist: an Asset Element Type Group, a Locator Element Type Group, and a System Element Type Group. The Asset Element Type Group includes all element types that define elements that represent code, data, or system components, for example, the elements that model code, data, or system components stored on Host A 228. The Locator Element Type Group includes all element types that define elements that store the various tasks or applications that are performed by the code, data and system components represented by the Asset Elements, as is described in the co-pending application entitled "An Object Management System Supporting the Use of Application Domain Knowledge Mapped to Technology Domain Knowledge" referenced above. The System Element Type Group includes all element types that define the elements that contain meta-data about the tool set of the Object Management System. For example, elements of this type will store meta-data describing the various relationships, and the locations of, the tools shown in FIG. 1 as Mission-Specific Facilities 108 and Common Facilities 110. System element types also include those types needed to support scripted tool invocation to be discussed below.

In the preferred embodiment, each of the definitions in FIG. 3, including Element Type 302, Binary Relationship Type 304, Attribute Type 314, and Element Type Group 318, are stored as objects within Element Repository 220. Element Repository provides a permanent, recoverable definition object stored in persistent storage (e.g., on disk) for each of these entities.

Figure 4:
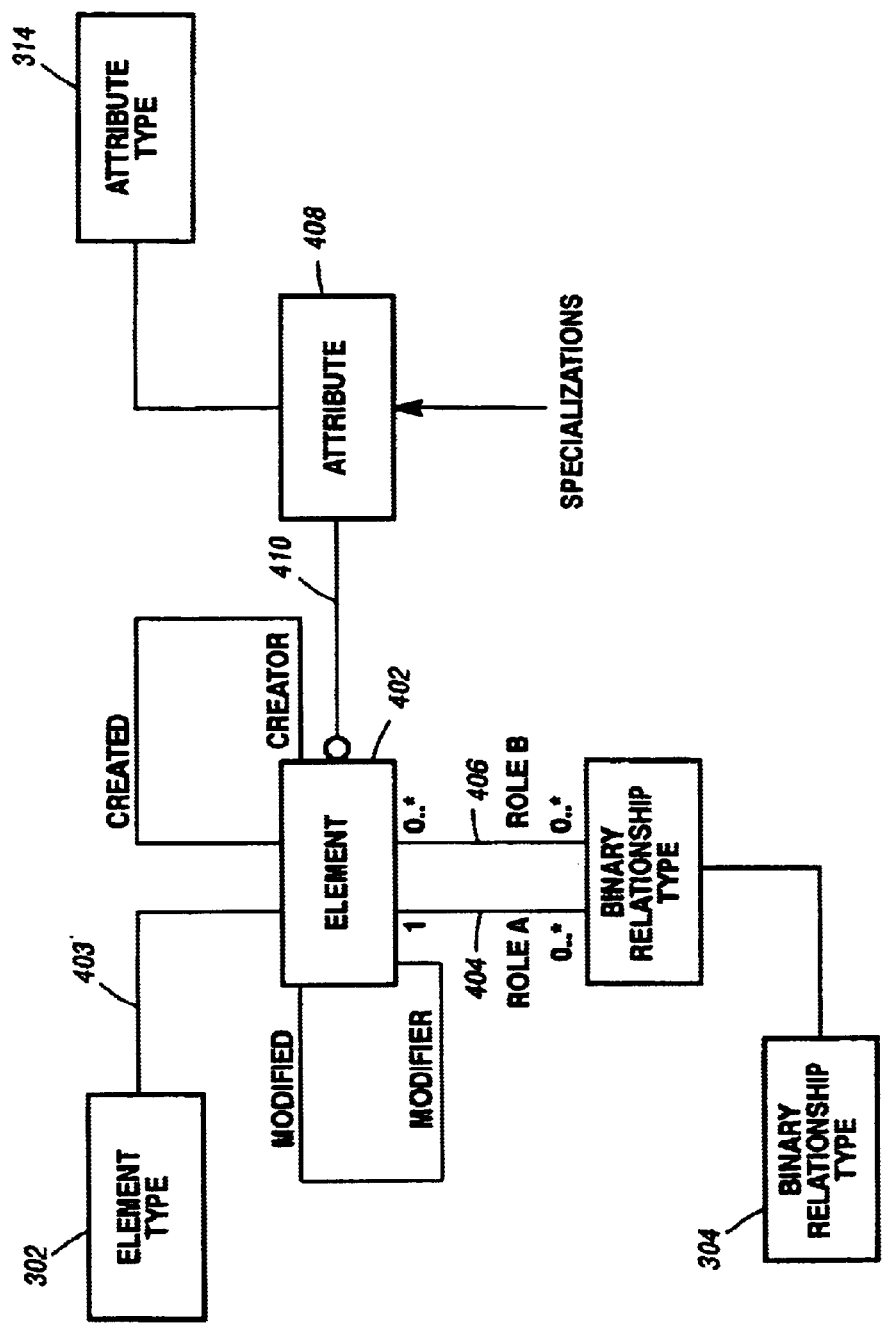
FIG. 4 is a block diagram showing the relationship between instances of elements and relationships, and the various type definitions provided in the model stored in the Element Inventory Schema.

FIG. 4 is a block diagram showing the relationship between instances of elements and instances of relationships, and the various type definitions provided in the model stored in the Element Inventory Schema. When an element, shown as Element 402, is created or loaded within Element Inventory 102, it is assigned to one of the predefined Element Types 302, as indicated by Line 403. Element 402 may be said to be an instance of that particular Element Type. By virtue of this association, Element 402 acquires the potential to be related to other defined element types according to each predefined Binary Relationship Type 304 that is defined for the Element Type 302, as is shown by Lines 404 and 406. Element 402 also may become associated with an Attribute 408 that is an instance of Attribute Type 314 defined for Element Type 302, as is represented by Line 410.

Element 402 and Attribute 408 are versioned objects, meaning that different versions of these elements may reside within the Element Inventory 102 at a given time. For example, if two versions of a tool exist, two different versions of the associated System element describing that tool will also exist. These two versions may or may not have relationships with different versions of a different element, depending on the interrelationships existing between the code entities within the system. For example, an updated version of a program will be associated with a later element version, which may or may not have the same relationships as the earlier element version. If the updated program version must reference an updated version of a table, for example, the table will further be described by meta-data in a later version of an associated element, and a relationship will be created between these two later versions of elements.

As discussed above and shown in FIG. 4, binary relationships are created between two elements. One manner of representing relationships between elements is by including pointers to the various related elements within the meta-data stored within an element. That is, the element stores a relationship indicator such as a pointer that may be used to address a respectively related element. The relationships may also be stored as objects. Those skilled in the art will recognize that many ways of representing the element relationships exist, such as by storing name indicators identifying the various related elements.

Figure 5:
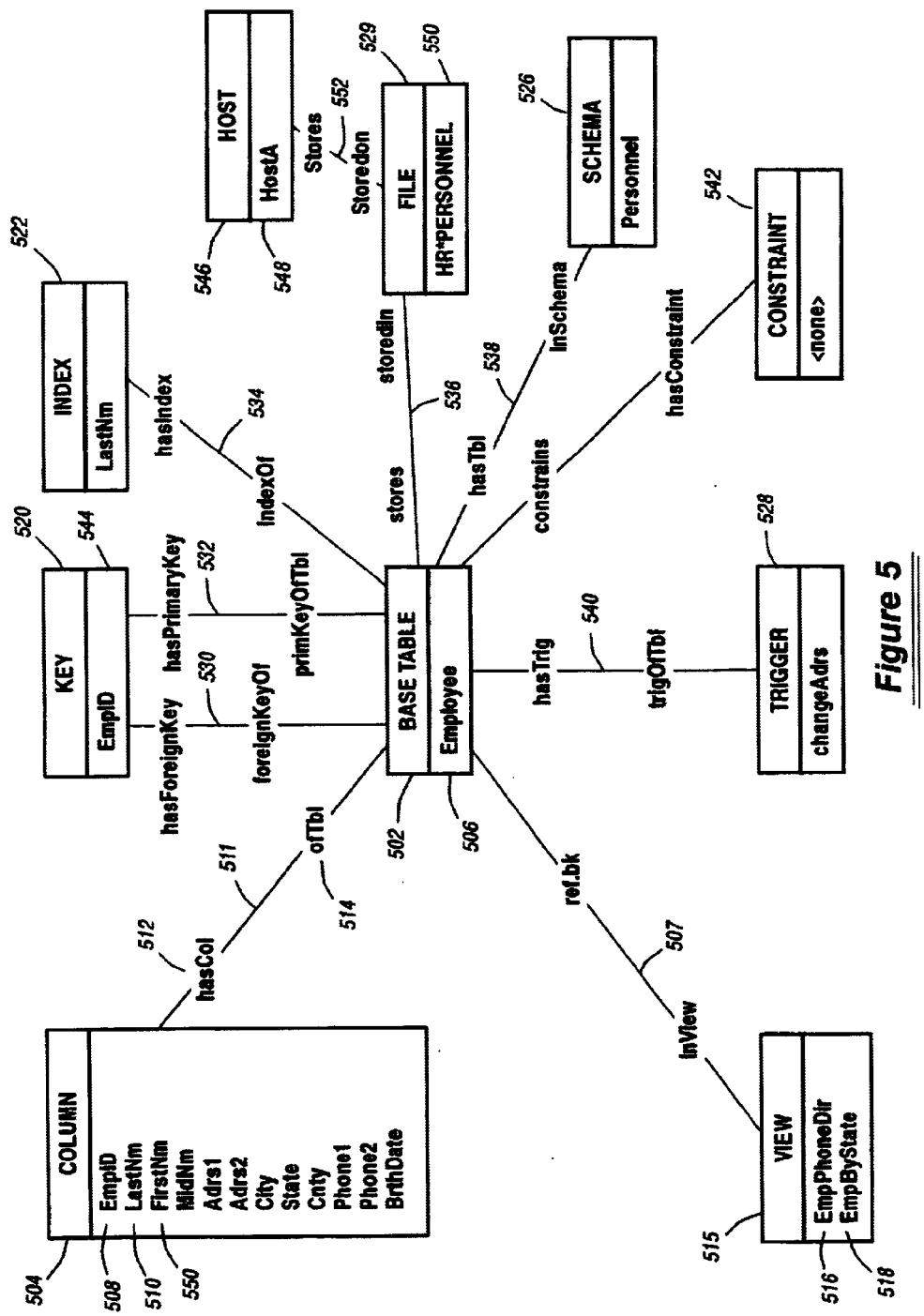
FIG. 5 is a block diagram exemplifying the use of a model to define Asset Elements.

FIG. 5 is a block diagram showing an example of using the element model to define Asset Elements. In this diagram, Asset Element types are listed at the top of each block, and the name of element instances is represented below the element type. For example, this block diagram assumes an Asset Element type of "BaseTable" 502 is defined in EIS 103. This element type has a Binary Relationship Type with the Asset Element type "Column" 504. This represents the fact that a software component which is a table (and which is represented by an element of element type "BaseTable") has (at least one) column. As stated above, the relationships between elements represent relationships between the components described by the elements.

FIG. 5 further depicts that an instance of element type "BaseTable" 502 exists called "Employee" 506. This element is a construct that stores data that describes the actual software module with which it is associated, which in this example is a table. That is, this element represents an actual table of data which exists elsewhere on the system, for example, on Host A 228. This element is assigned the element type of "BaseTable", and is also given a name representing the function provided by the table, which in this case is "Employee". The element further stores an indication of all other elements to which it is related. This actual table may include columns containing information about employees of a business. This is represented by the fact that element "Employee" is related to elements of type "Column" 504 that include elements "EmpID" 508, "LastNm" 510, and the like. These column elements are related to element "Table" through the Binary Relationship Type represent by Line 511, and described by roleA 404 and roleB 406 of "hasCol" 512 and "ofTbl" 514. This represents the relationship between the actual table component, and the individual column components that comprise the table. Hereinafter, for the sake of brevity, instances of binary relationships will be discussed and depicted in terms of either roleA 404 or roleB 406, but not both.

Element type "BaseTable" is shown having various other predefined relationships to other element types including element type "View" 515. Two instances of element type "View" 515 shown as "EmPhoneDir" 516 and "EmpByState" 518 are shown to exist, each having a relationship with element "Employee" 506 represented by Line 507. Other element types related to element type "BaseTable" include "Key" 520, "Index" 522, "File" 529, "Schema" 526, and "Trigger" 528, all of which have Element instances created and stored in the Element Inventory 102 which are related to element Employee 506, as is represented by Lines 530 and 532, 534, 536, 538, and 540, respectively. It may be noted that element type "Constraint" 542 is related to element type "BaseTable". However, for the particular element instance "Employee" of element type "BaseTable", no element instance of type "Constraint" 542 has been created. This demonstrates that the element and relationship type definitions within EIS 103 define potential, not mandatory, relationships which may or may not be established for a given element instance. It may further be noted that more than one type of relationship can be established between an element of a given element type and another element of a second element type. For example, element "Employee" 506 of element type "BaseTable" 502 is capable of establishing the two different types of relationships represented by Lines 530 and 532 with element "EmpID" 544 of element type "Key" 520.

Attributes 408 of a predetermined Attribute Type 314 may be attached to each of the Elements. For example, assume the element type "Column" is related to an attribute type of "DataType" describing the data type of the column data. For a created element instance of element type "Column", meta-data may be stored within the element to describe the data stored within the associated data module containing the column data, and may indicate that data is of type string, long integer, short integer, or character, for example.

For any of the Asset Elements, information is also stored that describes the location of the associated code, data or system component. This information does not necessarily have to be stored within each of the elements, but need only be stored within one of the elements within a group of elements. This can best be understood by returning to the current example. As noted above, it will be assumed element "Employee" 506 represents, and contains meta-data associated with, an actual table existing on one of the servers or host systems associated with the Object Management System 100. Assume this table resides on Host A 228 of FIG. 2. Somehow the location of this table must be recorded within the Element Inventory. This can be done by recording the information directly in each element associated with the table. For example, the server name, directory path, and any other location information could be recorded within element "Employee" 506, and further within all other elements describing the table data, including each and every Column Element shown in FIG. 5. This approach results in duplication of a large amount of data, since multiple elements store the same location information. This data duplication means that more space is required to implement Element Inventory 102, and also means that a change in location of a given code or data module requires changes to many elements.

Instead of storing location information in every element, in the preferred embodiment, the location of the table is only recorded once. This location is stored in a separate element having a dedicated element type. In the current example, this element type is called "Host" 546. An instance of this element type called "Host A" 548 is shown connected to element "HR*PERSONNEL" 550 via a relationship represented by Line 552. Element "Host A" 548 will include the server name and directory path for the file "HR*PERSONNEL" located on Host A 228. Further assume that the relationship represented by Line 536 indicates that the file "HR*PERSONNEL" stores a table represented by element "Employee" 506. Because the location of the file is known, by implication the location of the included table is also known, and can be determined by traversing element relationships stored within Element Inventory 102 to find the element of type "Host" 546.

The example of FIG. 5 helps illustrate the modeling approach. A model is stored within the EIS 103 describing potential relationships and attributes for a defined element type. For each element type, element instances may be created having only some, or all, of the predefined relationships. An element instance may have a selectable multiple number of relationships of a given type. For example, BaseTable "Employee" 506 has multiple relationships of the type "hasCol", each with an instance of element type "Column" 504.

At this point, it will be recognized by one skilled in the art that an object management system for managing code and data components could be constructed without the use of a model to define the various elements. For example, the definition of each of the element structures could be stored within the associated element itself without having a separate element definition provided by the model. In this case, however, element management routines would have to employ hard-coded data in the element instances themselves to determined valid relationships for a given type of element. This would make element management more complex and error-prone. This will be discussed further below.

The use of the model in searching the Element Inventory 102 is best shown by example. Assume the model for element type "BaseTable" is stored in the Element Inventory Schema 103. A particular named element within the Element Inventory may be known or is otherwise located. The associated element type for the known element is used to access the element type definition within the model. The model indicates that the subject element type is associated with one or more Binary Relationship Types. For each of these Binary Relationships Types, the meta-data stored within the element is analyzed to determine if any instance of these Binary Relationship Types exists for the particular element instance. If an instance of any of these Binary Relationship Types exists for the element instance, the Binary Relationship instance may be traversed to locate a related element. This process can be made recursive such that each of the identified elements is made the target of the search, and all related elements associated with the target are further identified. Using this method, the element relationships can be traversed to find all elements that are either directly, or indirectly, related to the target element. All relationship traversal is performed using the model definition. This model-based method is particularly useful because it can accommodate the situation wherein new element type definitions are added to the Element Inventory Schema 103, or wherein element type definitions are modified. This modification of element definitions can be accomplished without modifying any of the element management tools.

Figure 6:
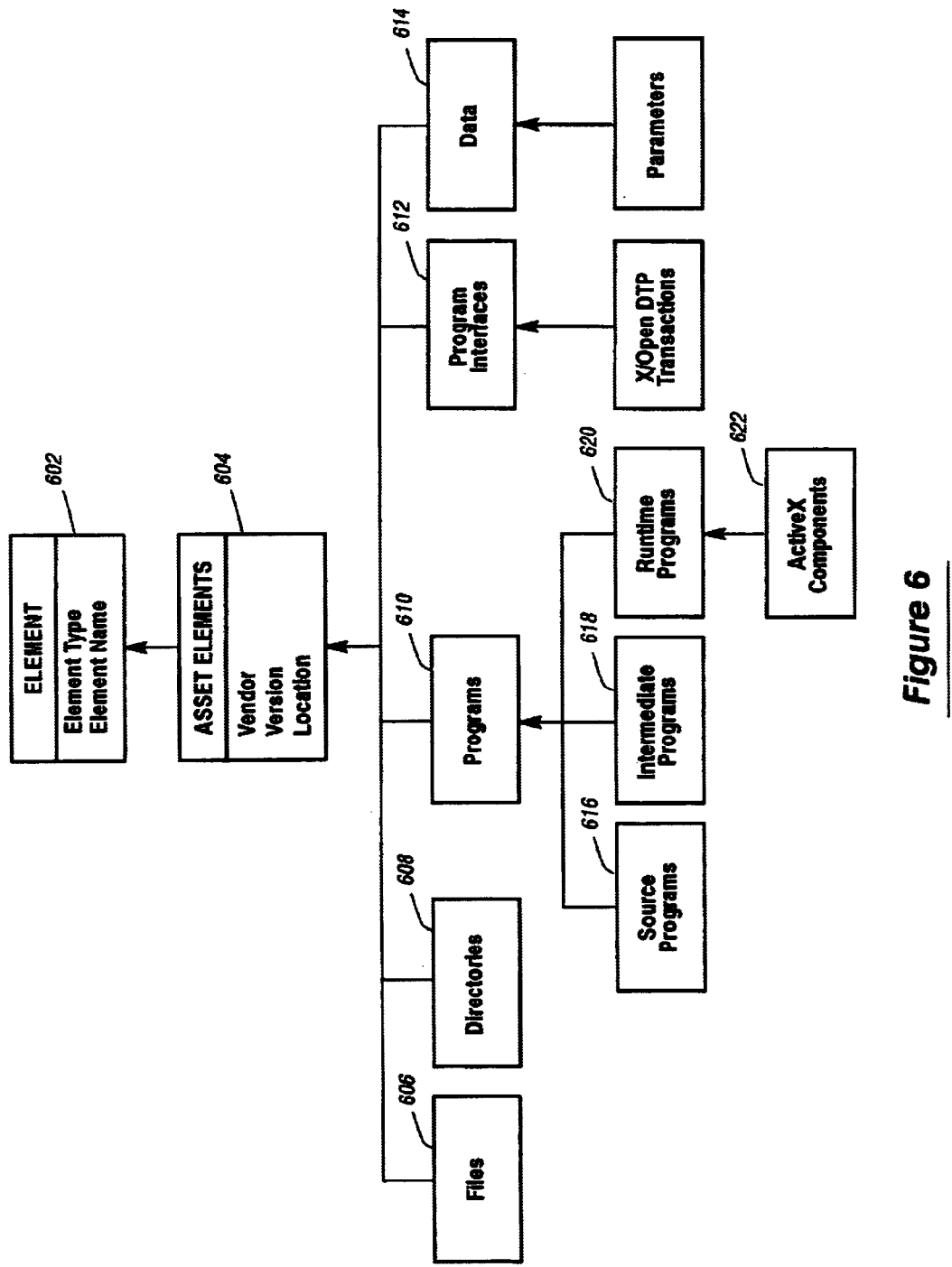
FIG. 6 is a diagram illustrating the hierarchical manner in which elements and element types are defined.

FIG. 6 is a diagram illustrating the hierarchical manner in which elements and element types are defined. As discussed above, a given element type may include element sub-types below it in the element hierarchy, and may be included within an element super-type that is above it in the hierarchy. At the top of the hierarchy is the element type "element" shown in Block 602. Under this element type is shown the element subtype "Asset elements" in Block 604. Other subtypes (not shown) of type "element" include "Locator elements" and "System elements". Many different subtypes are defined for the subtype "Asset elements". For example, all of the element types depicted in FIG. 5 are subtypes of the element type Asset elements. FIG. 6 illustrates some additional Asset element subtypes shown as "files", "directories", "programs", "program interfaces", and "data" in Blocks 606, 608, 610, 612, and 614, respectively. The hierarchy may extend many levels. For example, different subtypes of type "programs" are shown in Blocks 616, 618, and 620, with an additional subtype being shown in Block 622 for the subtype "runtime programs" shown in Block 620.

Each element type may be associated with one or more attribute types, as is discussed above. For example, the type "Asset elements" in Block 604 is shown associated with attribute types "vendor", "version", and "location". When element instances are created, these attribute fields store the meta-data that describes an associated code or data module. For example, the vendor attribute field of an element of element type "programs" could store the vendor name of an associated application program.

As shown in FIG. 6, the definitional structure of the elements in EIS 103 is hierarchical. This hierarchical structure supports the principle of "inheritance". According to this principle, each element type inherits the defined attribute types associated with the super-type immediately above it in the hierarchy, and further inherits the ability to form the relationship types that the super-type is capable of forming. For example, if the element type "programs" in Block 610 can form a relationship type with a particular data type, then all subtypes of "programs" shown in Blocks 616, 618, and 620 (and, in turn, Block 622) can also form this relationship type.

Brief Description of the Interactive Tools Supported by the Object Management System The relationships existing between the elements can be graphically displayed using several tools, including Element Viewers 144 supported by Object Management System 100. Functionality of these tools are implemented as ones of the Interactive Tools 259. Use of these tools can best be discussed by re-examining FIG. 5. As described above, FIG. 5 shows all of the relationships existing for a particular instance of element type "BaseTable" 502 wherein the element instance is named "Employee". This is the type of graphical display provided by the Relationship View included in the Element Viewers 144 of FIG. 1. This view is obtained by specifying a particular element name, in this case "Employee", as the selected element. Using this view with element "Employee" 506 identified as the selected element, all relationships associated with this selected element are shown as Lines 507, 512, and 530–540. The elements associated with element "Employee" 506 are shown on the periphery of the display interconnected to Lines 507, 512, and 530–540.

Different types of graphical displays can be obtained using other ones of the Element Viewers. The Affinity View allows a user to view a longer "chain" of relationships than can be easily viewed using the Relationship View shown in FIG. 5. For example, the string of relationships starting with element Employee 506 and ending with element HostA 548, or extending even further to include elements related to element HostA can be readily viewed using Affinity View. Alternatively, the Attributes View can be used to obtain a list of attributes associated with a given selected element.

Exemplary Uses of the Object Management System

The functions performed by the Object Management System 100 can best be understood by the following scenarios. Within a data processing system exists code and data modules. A knowledge base may be created to represent these code and data modules. A knowledge base contains the meta-data that describes the code and data components. A knowledge base can be generated with any one of a number of commercially available tools for analyzing code and data structures. These tools are shown as Element Discovery Tools 142 of FIG. 1. For example, the Fulcrum tool commercially-available from the RMC, Ltd., may be used to create an associated knowledge base. These types of tools can be synchronized with the model stored in the EIS 103 to create a knowledge base using Asset elements of the element types defined within the EIS. Element Discovery Tools further create relationships existing between ones of the newly created Asset elements to model relationships existing between the respective code and/or data modules modeled by the Asset elements. These Asset elements and relationships are stored in the Element Inventory 102.

After the Element Inventory is populated, a user may select a group of related elements to be modernized or transformed. This selection may be accomplished using Element Locator in a manner discussed in detail in the co-pending application entitled "An Object Management System Supporting the Use of Application Domain Knowledge Mapped to Technology Domain Knowledge" referenced above. These elements will be packaged using Element Packager 118 as discussed in co-pending application entitled "System and Method for Defining and Managing Reusable Groups of Software Constructs within an Object Management System" referenced above.

Once an element package has been so created, the package may be used to port the associated code and/or data modules defined by the element package to another data processing platform. Alternatively, those code and/or data modules may become the target of renovation operations such as those needed for Year-2000 problems. A still further alternative involves using the package to transform the associated code and/or data modules into another coding language, or to "wrap" those modules with an additional layer of code so that they become accessible from a different data processing environment other than the one on which they resides. For example, a user could use the DGate Ace tool commercially-available from the Unisys Corporation to build a wrapper around the code entry points of enterprise server transaction applications to make those applications callable from within a Microsoft ActiveX environment. Elements and element relationships are created for any newly created code and/or data modules and become part of the existing knowledge base.

In performing the above-described task, the user of the object management system must maintain an up-to-date and accurate knowledge base in the EIS 103 and the Element Inventory 102. To do this, many different object management tools are employed, including but not limited to the Element Packager 118, the Element Viewers 144, the Relationship Explorer 145, and the Plan Wizard 265. These tools perform functions that allow a user to create, modify, delete, reorganize, and view the elements and element types so that the knowledge base may be maintained in a current state.

Each of the tools described above performs a predetermined set of operations or functions that may be performed on a subset of the element types and/or elements stored in the system repository. Similarly, for each of the element types and element instances stored in Repository 220, a predetermined respective set of operations exists that defines the allowable operations that may be performed in association with that element type and element. Additionally, although more than one tool may be available to perform similar functions such as element creation or deletion, only certain tools are used to perform certain functions on specialized ones of the elements or element types. This will be discussed further below. In sum, the object management tools must be used correctly or the integrity of the knowledge base could be jeopardized. However, understanding the restrictions associated with the use of the tool set poses a challenging task, especially as additional tools, elements, and element types are added to the system.

The current invention provides a tool management system that both protects the integrity of the knowledge base, and aids the user in efficiently managing the element and element type information stored in the Repository 220. Before discussing the manner in which the tool management occurs, a detailed explanation of several specialized element types, including Interactive Operations and Tool element types are discussed.

Definition of Tool and Interactive Operations Element Types in the Element Inventory Schema To simplify the tool management task, the current Object Management System provides a tool interface that maps certain types of operations to certain element types. When a user is utilizing a selected tool to perform manipulation or management functions on a selected element or element type, this mapping function restricts the types of operations that may be performed, thereby preventing corruption of the Element Inventory 102 or the EIS 103. Furthermore, this interface allows the user to perform selected operations on a selected entity in a manner that is independent of any given tool or tool interface. If the selected operation is not part of the operations performed by the active tool, the selected operation is routed to the appropriate tool automatically, and the user does not have to be aware of which tool to invoke, nor the manner in which the tool is invoked. Moreover, the user does not have to be aware of the addition, deletion, or modification of any of the tools or tool functions as tool and/or function changes are masked from the user by the tool interface. The infrastructure for the tool interface and management system is provided by a definition of Tool and Interactive Operation Element Types in the EIS 103.

Figure 7:
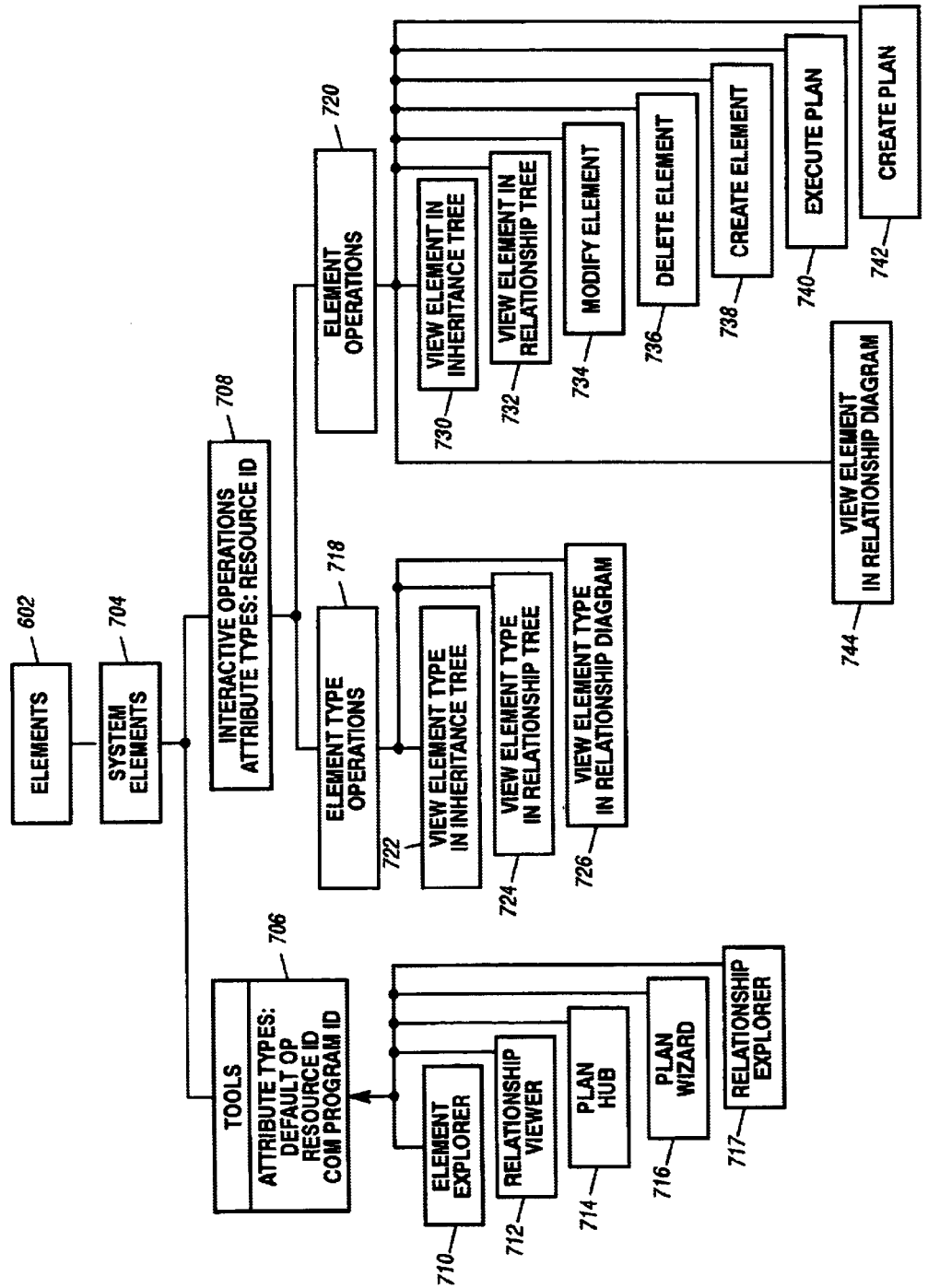
FIG. 7 is a diagram showing the hierarchical definition for Tool and Operation Element Types.

FIG. 7 is a diagram showing the hierarchical definition of system element types within EIS 103 that pertain to Tool and Operation Element Types. This diagram is similar to FIG. 6, showing the hierarchical definition associated with asset elements. As in FIG. 6, element type "Elements" is at the top of the hierarchy in Block 602. Below this element is defined subtype "System Elements" in Block 704. System element types include "Tools" and "Interactive Operations" shown in Blocks 706 and 708 respectively. Block 706 lists some of the Attribute Types defined for the Element Type "Tools", including "DefaultOp", "ResourceID", and "COMProgramID". Similarly, Block 708 lists "ResourceID" as an Attribute Type defined for the "Interactive Operations" Element Type. Each element in the Element Inventory 102 may include an attribute value for each of the attribute types that are defined for that element's associated element type. The use of these attribute types will be discussed further below. The principle of inheritance applies to attribute types. For example, every element type existing below type "Tools" in the hierarchy (that is, every subtype of type "Tools") has the attribute types associated with element type "Tools" listed in Block 706.

Element types that are below type "Tools" in the EIS hierarchy include, but are not limited to, element types "Element Explorer", "Relationship Viewer", "Plan Hub", "Plan Wizard", and "Relationship Explorer" in Blocks 710, 712, 714, 716, and 717, respectively. Each of these element types is used to describe and manage a respective tool existing within Object Management System 100. For example, element type "Element Explorer" corresponds to the Element Explorer that is included in Element Viewers 144 as discussed above.

Below element type "Interactive Operations" in Block 708 are "Element Type Operations" and "Element Operations" in Blocks 718 and 720, respectively. The "Element Type Operations" element types include, but are not limited to, "View Element Type in Inheritance Tree", "View Element Type in Relationship Tree", and "View Element Type in Relationship Diagram in Blocks 722, 724, and 726, respectively. Each of these "Element Type Operations" represents and describes a respective operation or function that may be performed on an element type existing in EIS 103 by one or more selected tools existing within Object Management System. For example, the "View Element Type in Relationship Tree" element type represents an operation that may be performed on a selected element type to display relationship types existing between the selected element type and any other element types. This type of operation may be accomplished using the Relationship Viewer of Element Viewers 144 discussed above.

The element types existing below the element type "Element Operations" in the hierarchy include, but are not limited to, "View Element in Inheritance Tree", "View Element in Relationship Tree", "Modify Element", "Delete Element", "Create Element", "Execute Plan", "Create Plan" and "View Element in Relationship Diagram" in Blocks 730, 732, 734, 736, 738, 740, 742, and 744 respectively. Each of these "Element Operations" element types represents and describes a respective operation or function that may be performed on an element instance existing in EI 102 by one or more selected tools existing within Object Management System. For example, the "View Element in Relationship Tree" element type represents an operation that may be performed on a selected element to display relationships existing between the selected element and any other elements. This type of operation may be accomplished using the Relationship Viewer of Element Viewers 144 discussed above.

Relationship types may be created between "Interactive Operations" element types and "Tools" element types. These relationship types create a mapping that is used during tool deployment to allow the system to determine the tool that performs a particular operation in a manner that is transparent to the user.

As will already be appreciated by the reader, the various element type definitions shown in FIG. 7 reside in EIS 103. As discussed above with respect to Asset Elements, for predetermined ones of these element types, element instances of the defined type may be created. For example, an asset element type of "Files" exists in EIS 103. Multiple instances of elements of type "Files" may be created in Element Inventory 102. A similar situation exists for element type "Tools" 706, except that in this instance, only a single element is created in Element Inventory that corresponds to any given tool type. The corresponding element is created to store the values of the attributes that are associated with each "Tools" element type, as shown in Block 706. This implementation was adopted because, in the system of the preferred embodiment, the Element Inventory is better suited for storing attribute data than is the EIS 103. In an alternative embodiment, the attribute information could be stored in conjunction with the element type definition in the EIS. As is the case with all elements, a tool element is associated with the respective "Tools" element type via a relationship existing between the Element Inventory 102 and the EIS. The use of the element instances of type "Tools" is discussed below.

Figures 8, 8A:
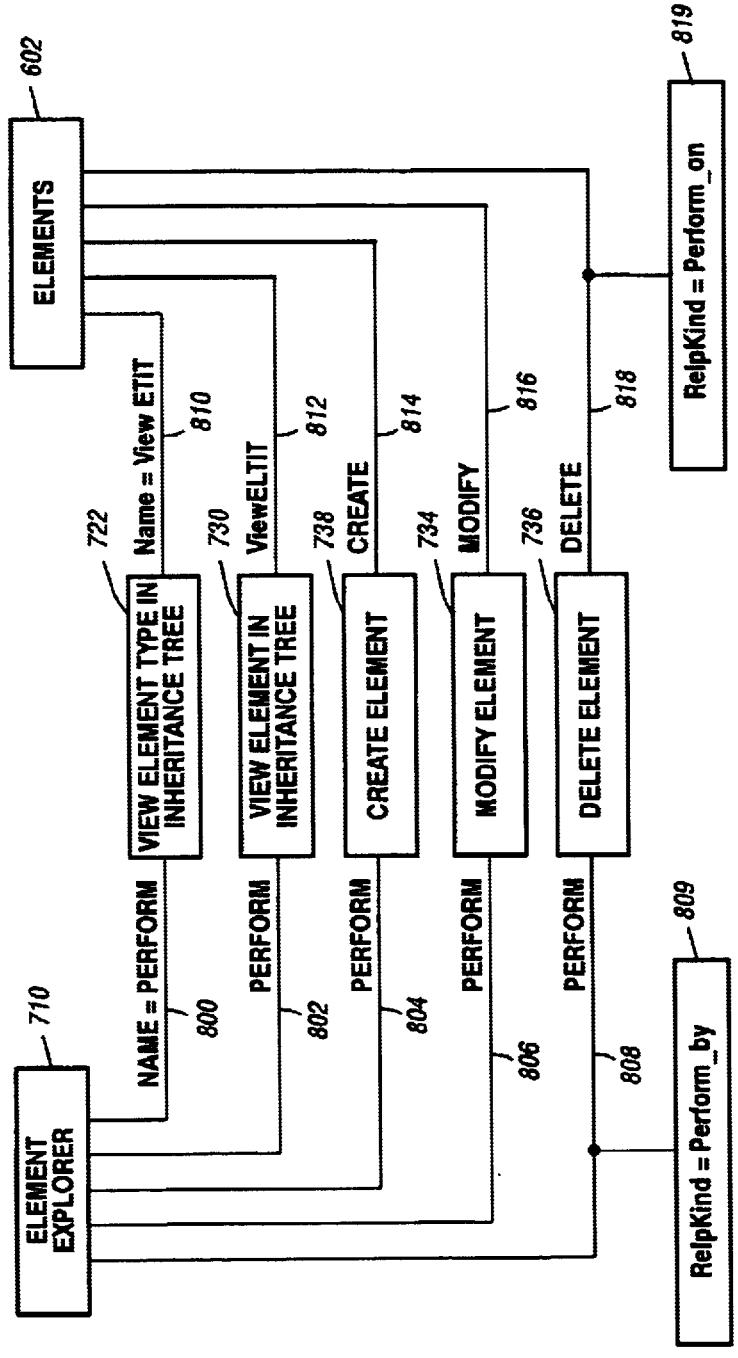
FIGS. 8A and 8B, when arranged as shown in FIG. 8, are a diagram illustrating relationships existing between "Interactive Operations" and "Tools" element types in the preferred embodiment of the invention.
Figure 8B:
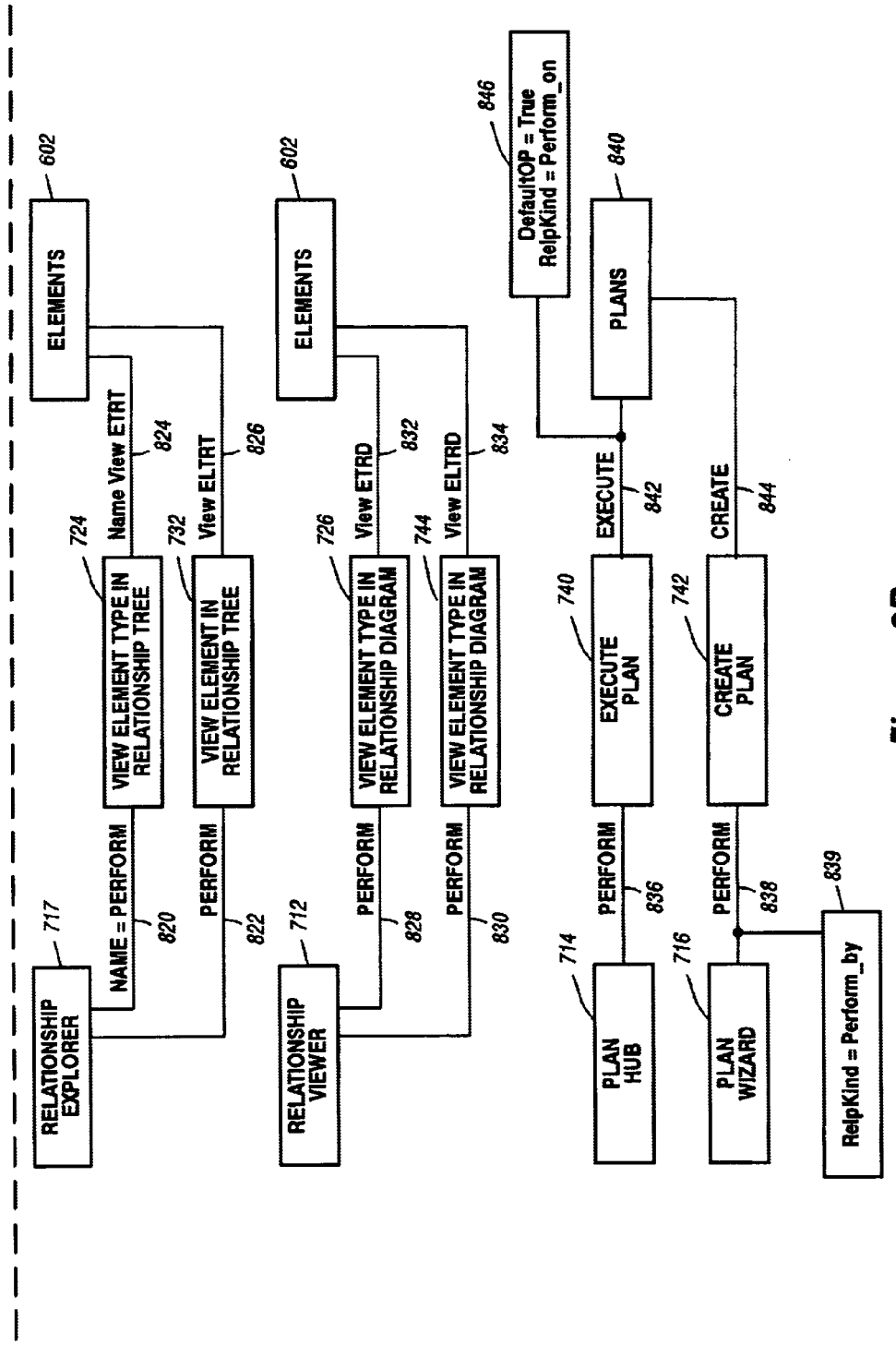

FIGS. 8A and 8B, when arranged as shown in FIG. 8, are a diagram illustrating relationship types existing between "Interactive Operations" and "Tools" element types in the preferred embodiment of the invention. In Block 710 is shown the element type "Element Explorer" from FIG. 7 that represents and describes the Element Explorer that is included in Element Viewers 144. This element type is associated with relationship types shown by Lines 800, 802, 804, 806, and 808 that exist between Interactive Operations element types. These related Interactive Operations element types include "Element Type Operations" element types such as "View Element Type in Inheritance Tree" in Block 722 (as shown in FIG. 7). These related Interactive Operations element types further include "Element Operations" element types such as "View Element in Inheritance Tree" in Block 730 (as shown in FIG. 7). These related Interactive Operations element types represent and describe the operations that can be performed on the element types and on the element instances by the tool described by the related tool element type. For example, the Element Explorer tool described by Tools element type "Element Explorer" in Block 710 can be used to view both element types and elements in an inheritance tree format. This is represented by the relationship types shown as Lines 800 and 802, respectively, which are interconnected to the respective Interactive Operations element types in Blocks 722 and 730. Each Element Operations element type is always associated with exactly one Tools element type.

Each of the Lines 800–808 represents a relationship type stored in EIS 103. As is indicated by FIG. 8A, each of the relationship types represented by Lines 800–808 has a relationship name of "Perform". In addition to a relationship name, each relationship type may be associated with one or more pieces of information called a "type attribute". Type attributes are pieces of information, or data fields, that describe "types", where "types" in this context means either an element type, a relationship type, or an attribute type. Some type attributes are common to all types. For example, each type, including each element type, each relationship type, and each attribute type, is associated with a type attribute called "Unique ID" which is an alphanumeric identifier stored in the EI that uniquely identifies the element type, the relationship type, or the attribute type. In contrast, some type attributes are unique to the type. For example, relationship types have some attribute types that are not associated with either element or attribute types. For example, one of the type attributes that is unique to relationship types is called "Relationship Kind", or "RelpKind", as is shown in Block 809. A detailed understanding of this association is not necessary for purposes of this application, and it is sufficient to note that each relationship type is associated with this data item. Block 809 represents the fact that the relationship type illustrated by Line 808. has the type attribute of "RelpKind" set to the value "Perform_by". Although not shown, each of the other relationship types represented by Lines 800–808 also has the type attribute of "RelpKind" set to "Perform_by". The significance of the type attribute "RelpKind" will be discussed below.

In addition to the relationship types formed between "Interactive Operations" element types and "Tools" element types, FIG. 8A also shows relationship types formed between "Interactive Operations" and the element type "Elements" 602 on Lines 810–818. The names for these relationship types are shown on the respective Lines representing those relationship types. Each of these relationship types is associated with the type attribute called "RelpKind" in the manner described above. As indicated by Block 819, the relationship type represented by Line 818 has the associated type attribute of "RelpKind" set to "Perform_on". Although not shown in FIG. 8, each of the other relationship types illustrated by lines 810–816 also have this type attribute field set to "Perform_on". The significance of this type attribute will be discussed further below.

As discussed above and shown in FIG. 6, the element type "Elements" is at the top of the element hierarchical definition in EIS 103. Because of the principle of inheritance, every relationship that can be formed between the element type of "Elements" and "Interactive Operations" element types can also be formed between "Interactive Operations" element types and every other element type in EIS. This represents the fact that the operation represented by the element type in Block 722 can be performed on every element type defined in EIS 103. Similarly, the operations represented by element types in Blocks 730–738 can be performed on every element in Element Inventory 102. For example, Element Explorer can be used to view any element type in the EIS 103 or any element in the Element Inventory102 in inheritance format. The use of this relationship type information in invoking tools is discussed below.

FIG. 8B illustrates relationship types existing between other "Tools" and "Interactive Operations" element types in a manner that is similar to the diagram provided for "Element Explorer" element type in FIG. 8A. Element type "Relationship Explorer" in Block 717 is related to "View Element Type in Relationship Tree" and "View Element in Relationship Tree" Interactive Operations element types, as shown by Lines 820 and 822, respectively. In turn, "View Element Type in Relationship Tree" and "View Element in Relationship Tree" Interactive Operations element types are related to element type "Elements" via relationship types shown by Lines 824 and 826, respectively. The inheritance principal applies to these relationship types in the manner discussed above. These element and relationship type definitions represent the fact that the Relationship Explorer tool 145 of FIG. 1 may be used to view all element types in EIS and all elements in the Element Inventory in the Relationship Tree format.

Element type "Relationship Viewer" in Block 712 is related to "View Element Type in Relationship Diagram" and "View Element in Relationship Diagram" Interactive Operations element types, as shown by Lines 828 and 830, respectively, wherein each of these Lines represents a unique relationship type. The Interactive Operations element types "View Element Type in Relationship Diagram" and "View Element in Relationship Diagram" Interactive Operations element types are related to element type "Elements" via relationship type shown by Lines 832 and 834, respectively. These element type and relationship type definitions represent the fact that the Relationship Viewer tool, which is part of Element Viewers 144, may be used to view all element types in EIS and all elements in the Element Inventory in the Relationship Diagram format.

Tools element types "Plan Hub" and "Plan Wizard" in Blocks 714 and 716, respectively, are shown having relationship types indicated by Lines 836 and 838 to Interactive Operations Element types "Execute Plan" and "Create Plan". These element types are shown in Blocks 740 and 742, respectively. Each of these Interactive Operations element types have relationship types to a system element type called "Plans" shown in Block 840. These relationship types are indicated by Lines 842 and 844, respectively. The element type "Plans" is used to define elements in Element Inventory of type "Plans", wherein these elements are used by Plan Wizard 265 to develop scripts which perform batch-mode processes. Plan Hub 288 executes the scripted tool invocation that is described by the Plan element. The details concerning the use of the "Plans" element type is largely beyond the scope of this application, and is described in detail in the co-pending application entitled "A Process-Driven Tool Interface for an Object Management System", referenced above, and incorporated herein by reference in its entirety. Each of the relationship types shown in FIG. 8B is associated with a name and a type attribute of "RelpKind". The relationship types represented by Lines 820, 822, 828, 830, 836, and 838 each has a name of "Perform" and the type attribute "RelpKind" set to the value "Perform_by". This type attribute association is indicated by Block 839 for the relationship type indicated by Line 838. Similarly, each of the relationship types represented by Lines 824, 826, 832, 834, 842, and 844 has the name that is shown associated with the respective relationship type, and further has a type attribute of "RelpKind" set to "Perform_on". This is shown for exemplary purposes by the attribute type value for RelpKind indicated by Block 846. Additionally, Block 846 includes another type attribute called "DefaultOp"with a value of "True". This attribute type is unique to certain ones of the relationship types, including that relationship type indicated by Line 842. The use of these attribute types will be discussed below.

As discussed above, Application Main is responsible for the start-up and management of the various Interactive Tools 259, and for the routing of operations between these Interactive Tools. To accomplish these tasks, following client log-in, Application Main obtains information about the operations and tools currently installed in the system. This is accomplished by Application Main calling ones of the AIM EXE functions to read the element subtypes of "Tools" and "Interactive Operations" and their elements from EIS 103 and Element Inventory 102, respectively. The information that Application Main subsequently uses for tool management and operation routing is maintained in three internal tables. The description of these three tables follows.

FIG. 9 is the Operations Table that maps unique identifiers associated with each of the Interactive Operations element types defined in the EIS with exactly one unique identifier associated with the related Tools element type. These identifiers for the Interactive Operations and Tools element types are stored in the EIS in the respective element type definition and uniquely identify the element type. In the preferred embodiment, these identifiers consist of a string of alpha-numeric characters. For each of the Interactive Operations element types, the Interactive Operations element type identifier, or "Op Uid" is entered in Column 900 of the Operations Table. The related Tools element type identifier, or "Tool Uid", is entered in Column 902 of this Table. As discussed above, each Interactive Operations element type is associated with exactly one Tools element type.

Figure 10:
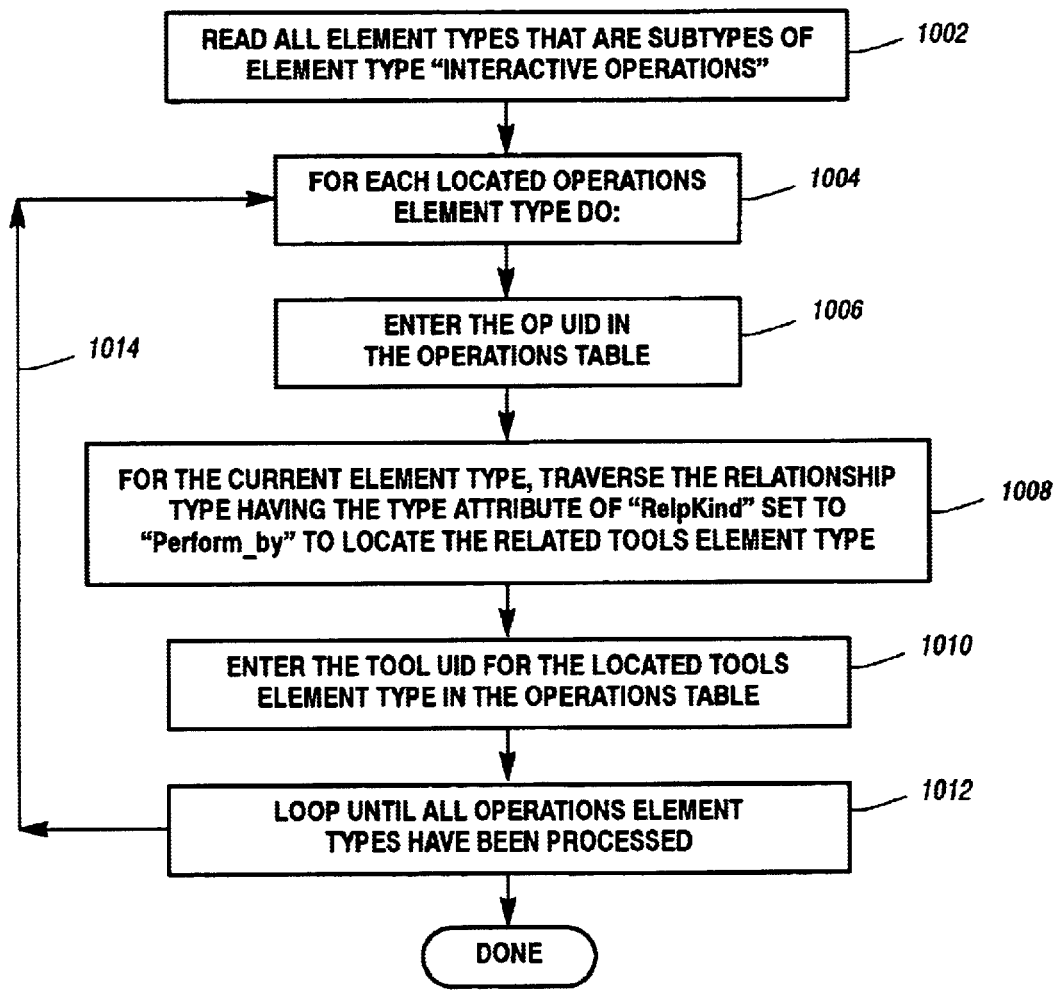
FIG. 10 is a flowchart of the method used by Application Main to initialize the Operations Table.

FIG. 10 is a flowchart of the method used by Application Main 271 to initialize the Operations Table shown in FIG. 9. First, all element types that are below "Interactive Operations" element type (Block 708 of FIG. 7) in the hierarchical element type definition (that is, all subtypes of the "Interactive Operations" element type) are read from EIS 103. This can be accomplished using a recursive call to the AIM EXE function "Get Element Types" discussed above. This is shown in Step 1002 of FIG. 10. Once all Interactive Operations element types are read from the EIS, a processing loop is entered as indicated by Step 1004. According to this processing loop, one of the retrieved element types is selected as the current element type. The unique element type identifier associated with this element, also referred to as the "Op Uid" as discussed above, is entered into Column 900 of the Operations Table. This is indicated by Step 1006. This Op Uid may be used to access the EIS to retrieve additional information about the associated element type. Next, for the current element type, the relationship type having the RelpKind type attribute set to "Perform_by" is traversed to locate the related Tools element type, as shown in Step 1008. The unique identifier for the located Tools element type, also referred to as the "Tool Uid", is entered into Column 902 of the Operations Table, as illustrated by Step 1010. This series of steps is re-executed for all Interactive Operations element types defined in the EIS, as shown by Step 1012 and Arrow 1014.

FIG. 11 is the Tool Table that stores attributes for the currently installed interactive tools. This table maps the Tools element types to the Attributes associated with the Tools element types. Column 1100 of the Tools Table stores the Tool Uids for each of the Tools element types. For each entry in Column 1100, a corresponding column entry is created to store each of the Attributes associated with the respective Tools element type identified in Column 1100. These Attributes include those shown in Block 706 of FIG. 7. The multiple column entries, each created to store a respective one of the various Attributes, are shown in FIG. 11 as Attribute Columns 1 through N, and are hereinafter referred to collectively as Columns 1102.

Figure 12:
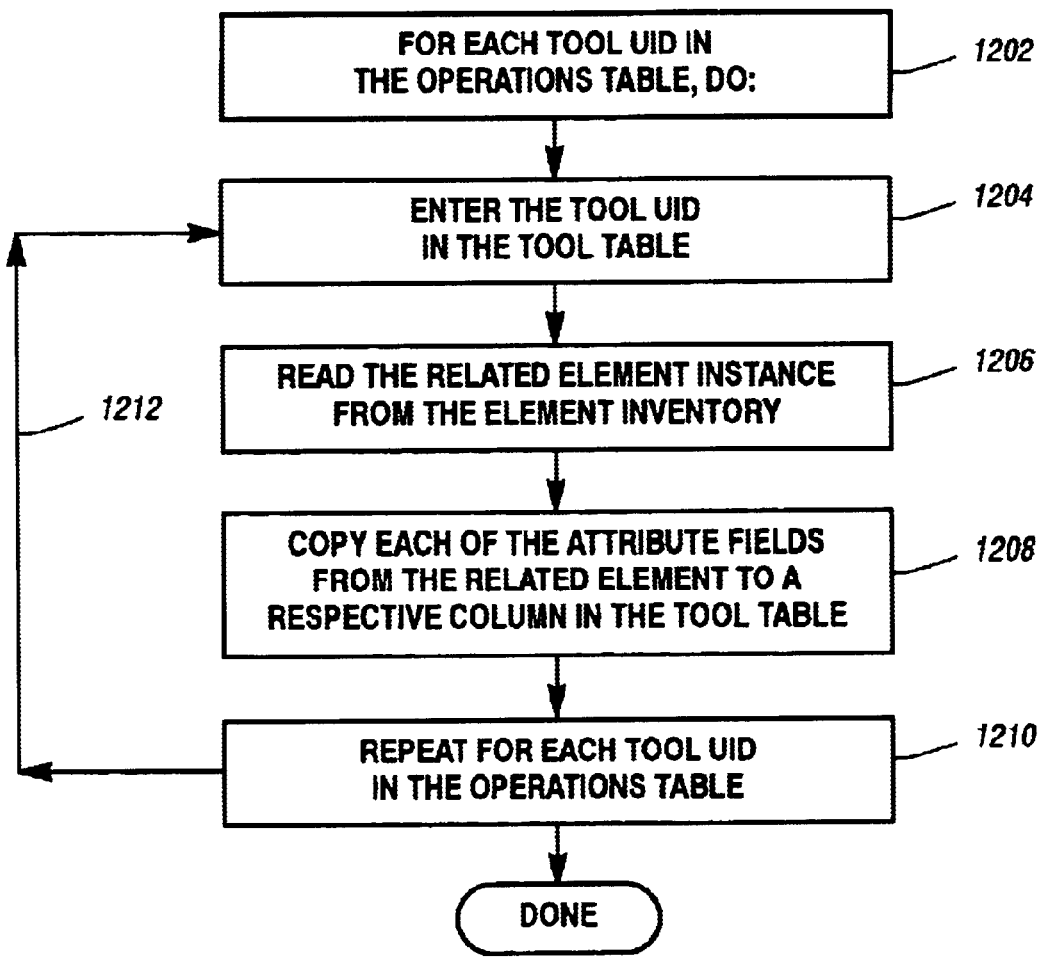
FIG. 12 is a flowchart of the method used by Application Main to initialized the Attributes Table.

FIG. 12 is a flowchart of the method used by Application Main 271 to initialize the Tool Table of FIG. 11. In Step 1202, a processing loop is entered to process each of the Tool Uids listed in Column 902 of FIG. 9. One of the Tool Uids is selected as the current identifier, which is moved to Column 1100 of the Tool Table, as shown in Step 1204. As discussed above, a single element is defined in the Element Inventory for each Tools element type for use in storing Attribute information. To retrieve this Attribute information from the Element Inventory, the Tool Uid is supplied as an input parameter to the AIM EXE function "Get Elements" to read the associated element. The Attribute information from the retrieved element is entered into the associated entry in Columns 1102 as shown in Step 1208. According to another embodiment, the Attribute information could be stored in, and retrieved from, the EIS instead of the Element Inventory.

To complete table initiation, the above-described Steps are repeated for each Tools element type identified in the Operations Table, as shown by Step 1210 and Arrow 1212.

The discussion now turns to the use of multiple windows in the current invention. As is known in the art, data processing systems may be capable of having multiple windows active at a given time, with each window being associated with a respective program. A user may toggle between windows using a series of keystrokes, by using commands initiated by a point-and-click device such as a mouse, or using other selection mechanisms known in the art. The current invention allows multiple windows to be active simultaneously, with each window displaying a different tool. The information pertaining to a window and its respective tool is stored in the Active Windows Table of FIG. 13.

FIG. 13 is the Active Windows Table. Unlike the Operations and Tool Tables of FIGS. 9 and 11, respectively, the entries in the Active Windows Table are not initialized when Application Main 271 is initialized. Instead, entries are added to this table as tools are started, and entries are deleted as tools are stopped. At any time, there may be zero, one, or multiple entries within the Active Windows Table for any given tool. Multiple entries will exist for a tool if multiple copies of the tool have been started in different windows.

The Active Windows Table stores multiple columns of data for each tool entry as follows:

Tool Uid:

Column 1300 of FIG. 13 stores the Tool Uid discussed above, which is used to identify a tool element type.

IIntToolControl Pointer:

Shown stored in Column 1302, this pointer points to a Component Object Module (COM) interface associated with the respective tool. This COM interface, referred to as "IIntToolControl", will be discussed further below.

LoginControl Pointer:

Column 1304 stores the LoginControl Pointer that points to an internal structure used by Application Main 271 to control the repository session for a tool. Whether or not a tool requires a repository session is indicated by the tool attribute "Uses Repository Session" as is stored in Columns 1102 of the Tool Table of FIG. 11.

Most Recently Used (MRU):

Column 1306 contains a boolean value referred to as "Most Recently Used" (MRU). This field is used when multiple copies of a tool have been started, and is set to a true value for the table entry corresponding to the tool copy that was most recently used for the given tool, and is false for all other tool copies. Application Main 271 updates MRU as the user toggles through tools via the Tools Menu provided by Application Main 271 to be discussed below.

An exemplary use of the Active Windows Table follows. Assume three copies of the Relationship Explorer tool 145 is running. In addition to entries for any other tools that are running, the Active Windows Table will include three entries for the Relationship Explorer tool. The Tool Uid Column 1300 will store the same text string data for each of the three entries. The IIntToolControl Pointer and LoginControl Pointer in Columns 1302 and 1304, respectively, will be unique for each of the three entries. MRU is true for one of the entries associated with the Relationship Explorer tool, and is false for the other two.

As discussed above, the tables described in the foregoing paragraphs are used by Application Main to implement a routing mechanism. According to this routing mechanism, a user may utilize a selection interface provided by a selected one of the Interactive Tools 259 to choose an operation to be performed on an element or element type. The selected operation may or may not be contained in the set of operations performed by the Interactive Tool used to make the selection. If the operation is not included in the set of operations performed by the Interactive Tool used to make the operation selection, the operation will be routed from the originally-selected tool to Application Main, which then forwards the operation to the correct one of the Interactive Tools to be executed. In this manner, the user need not be aware of which tool is associated with the selected operation. The manner in which this routing occurs is described in the following paragraphs.

Routing of Interactive Operations

Figure 14:
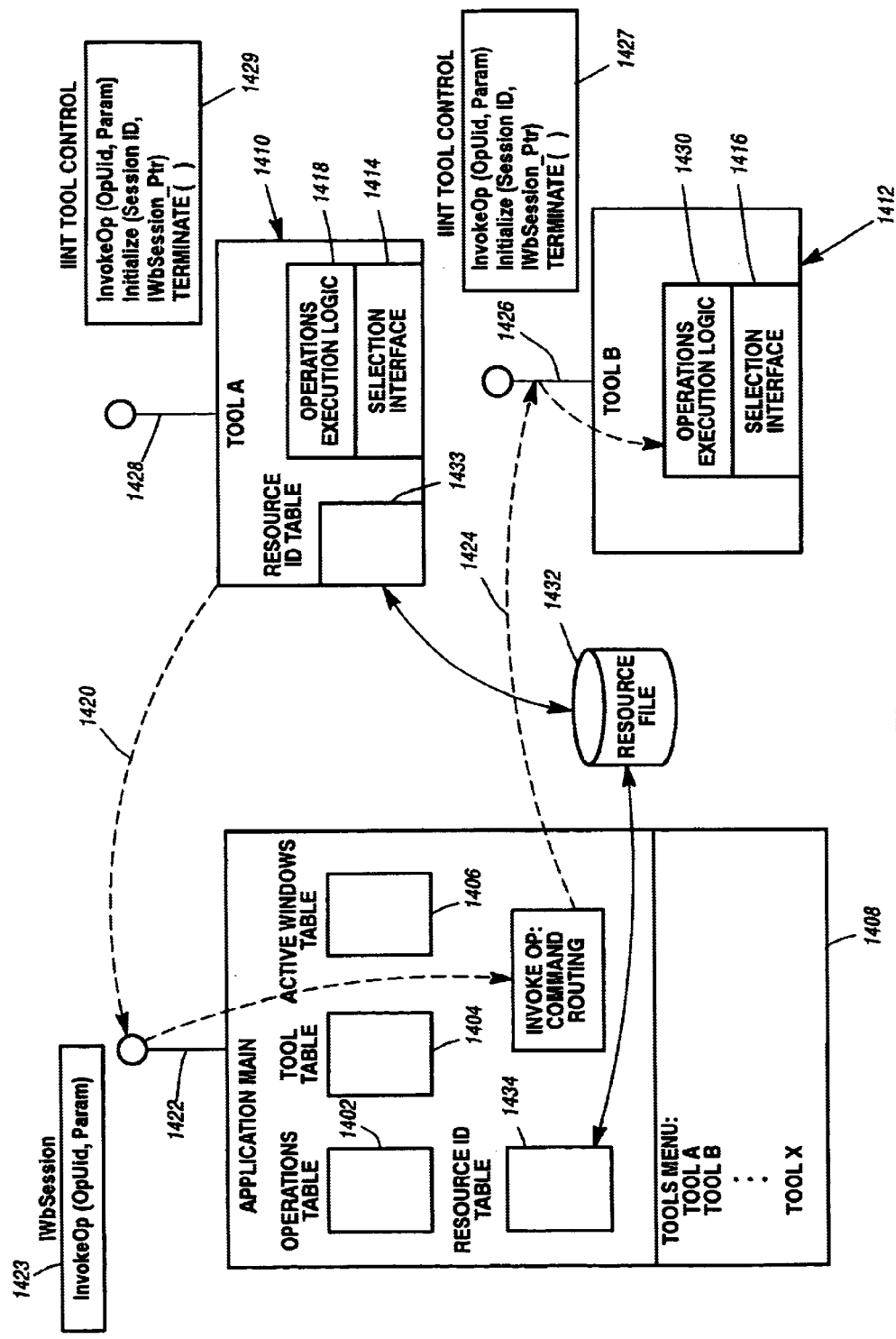
FIG. 14 is a block diagram providing an overview of the manner in which Interactive Operations are routed between ones of the Interactive Tools 259 and Application Main.

FIG. 14 is a block diagram providing an overview of the manner in which Interactive Operations are routed between ones of the Interactive Tools 259 and Application Main 271. After Application Main initializes the Operations and the Tool Table, shown as Blocks 1402 and 1404, respectively, of FIG. 14, Application Main provides a Tool Menu to the user. This is shown as Block 1408. This Tool Menu could be provided as a Graphical User Interface (GUI) displayed on Display Terminal 223, or any of the other types of interfaces that are known in the art. This Tool Menu may be provided by reading information stored in the Tool Table in FIG. 11. In an alternative embodiment, the Tool Menu may be provided by reading the tool objects from the Element Repository 220.

Using the Tool Menu, the user selects a tool to invoke using a series of keystrokes, a series of point-and-click operations, a combination thereof, or some other method. In response, Application Main starts an active window and launches the selected Interactive Tool. To accomplish this, Application Main 271 uses the Tool Table to determine if the attribute "Uses Repository Session" is set to true for the Tool Uid associated with the selected tool. If it is, Application Main creates a repository session for the tool using Session Controller 248. Next, Application Main creates a window and the IIntToolControl pointer for the tool. Application Main then uses the "COM Program Id" attribute read from the Tool Table 1404 to make various operating system calls to populate the newly-created window with the tool.

After the window is populated, the Initialize( ) method provided by the tool's IIntToolControl COM Interface is called. This method is shown included in Blocks 1428 and 1427 depicting the IIntToolControl COM Interface for two exemplary tools, Tool A and Tool B, respectively. The method call Initialize( ) passes the parameters "SessionId" obtained when the Repository Session was created so that the tool is able to access the UREP Element Repository 220. This call also passes the IWbSession interface pointer for Application Main's IWbSession COM Interface 1422 to enable the tool to make program calls back to Application Main. Finally, Application Main calls the InvokeOp( ) method of the IIntToolControl COM interface for the selected tool, passing in the tool's "Default Op" attribute read from the Tool Table as the operation to be executed. Application Main then adds an entry for this window to the Active Windows Table. Following completion of this initialization process, a copy of the tool is running in an active window, which is displayed for the user. One or more tools may be started in this manner by initiating tool invocation using the Application Main tool menu 1408.

After at least one tool is started, tool command routing may be performed. For example, assume that Tool A and Tool B have been started, as represented by Blocks 1410 and 1412, respectively. The tools shown as Interactive Tools 259 of FIG. 2 are in general each provided to perform predetermined operations on elements and/or element types resident in Element Inventory 102 and/or EIS 103, respectively. The Interactive Tools have access to the Element Inventory 102 and EIS 103 via the interface represented by Control Flow Indicator 262 and Data Flow Indicator 264 of FIG. 2. Before the operations are performed, the user must first select an element or element type on which to operate. According to one embodiment of the invention, each Interactive Tool is provided with an interface that allows a user to select either an element or an element type from Element Inventory 102 or EIS 103. The element and element type selection interfaces for Tools A and B are shown as Selection Interfaces 1414 and 1416, respectively.

For this example, it will be assumed Selection Interface 1414 of Tool A 1410 is employed in conjunction with the user interface shown as Display Terminal 223 in FIG. 2 to allow a user to make an element or element type selection. After this selection is made, and in a manner to be discussed below, Tool A displays all operations that are allowable for the selected element or element type. Selection Interface 1414 provides a display screen on Display Terminal 223, and the user selects the desired operation to be performed on the selected element or element type. Selection Interface of Tool A determines whether the selected operation is an operation that may be executed by Tool A, or whether that operation is associated with an external one of the Interactive Tools. This is discussed further below. If the selected operation is performed by Tool A, the operation is passed in a manner known in the art to Operations Execution Logic 1418 of Tool A to be performed. Otherwise, the selected operation is passed to an exposed method for Application Main's IWbSession COM Interface. As discussed above, the interface pointer for IWbSession was passed to the tool when Application Main called the Initialize( ) method for the IIntToolControl COM interface when this copy of Tool A was invoked. The exposed method used to make this call is shown as "InvokeOp" in Block 1423 of FIG. 14.

Method "InvokeOp" of Application Main is passed a parameter list including the selected element or element type identifier and the selected Interactive Operations element type identifier (Op Uid). The Op Uid is used to reference the Operations Table to determine which Tool Uid is associated with the selected operation. Next, Application Main uses the Tool Uid obtained from the Operations Table to reference the Active Windows Table to determine if an active window exists for this tool. If an active window does exist, Application Main obtains the IIntToolControl pointer for this tool to call the tool in a manner to be discussed below. If there are multiple entries for this Tool Uid in the Active Windows Table, the IIntToolControl pointer is selected for the entry having the MRU set to true.

If the selected tool is not active such that an entry does not exist for this Tool Uid in the Active Windows Table, Application Main uses attribute information contained in Tool Table 1404 to launch the tool and to create an associated entry in Active Windows Table 1406. This is accomplished using the same steps discussed above in reference to tool invocation following tool selection from Tools Menu 1408. However, in this case, the newly-invoked tool is passed the Op Uid selected by the user instead of the operations identifier obtained from the tool's "DefaultOp" attribute as stored in Columns 1102 of the Tool Table.

For purposes of this example, it will be assumed that Tool B 1412 is determined to be associated with the selected operation. Since for this example, Tool B is already associated with an active window, Application Main routes the selected operation to Tool B, as shown by dashed Line 1424, by making a call to the exposed method "InvokeOp" provided by the COM Interface "IIntToolControl" 1426 of Tool B. "InvokeOp" is passed the operations parameters, including the selected Op Uid.

As discussed above, each of tools includes the COM Interface "IIntToolControl". This COM interface includes the exposed method "InvokeOp" for use in receiving the Interactive Operations passed both during tool initialization, and during command routing. Additionally, each of the COM Interfaces also includes the exposed methods "Initialize( )", and "Terminate( )", which are used to perform initialization and termination functions, respectively. The use of the Initialize( ) method was described above in reference to the initialization of the tools. These methods are shown in Block 1429 for the COM Interface 1428, and are shown in Block 1427 for COM Interface 1426.

Parameters that are received by the IIntToolControl COM Interface, including the element or element type identifier and the Op Uid, are passed to Operations Execution Logic 1430 of Tool B to perform the selected operation. Thereafter, the window associated with Tool B remains active as the current window, and Selection Interface 1416 of Tool B could be used to select another element, element type, and/or operation to be performed. Depending on the selections made, Tool B may perform the operations, or the operation may be routed via Application Main to Tool A or yet another one of the Interactive Tools 259. Application Main and the various Selection Interfaces therefor serve as a routing means for routing the selected operation to the correct tool as shown by the dashed arrows of FIG. 14.

Figure 15A:
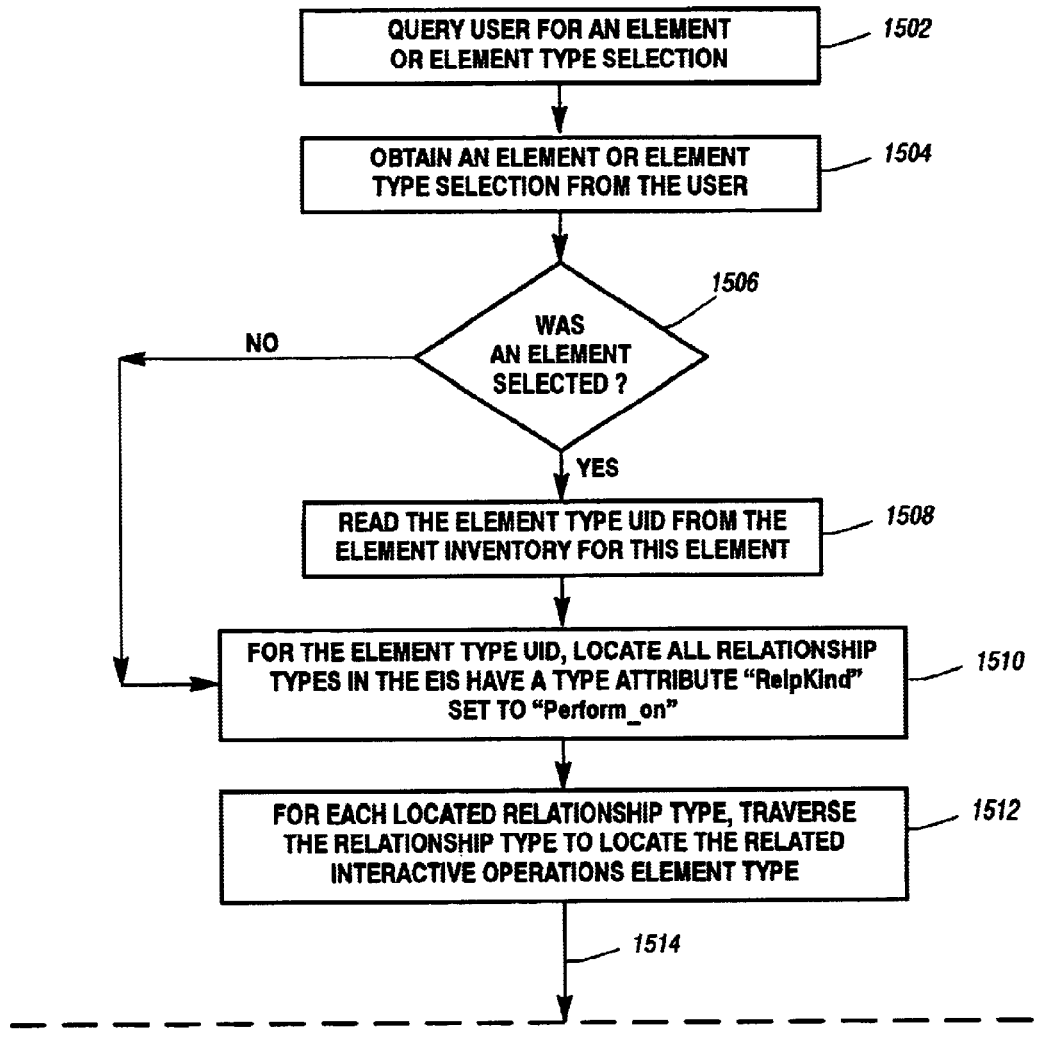
FIGS. 15A and 15B, when arranged as shown in FIG. 15, are a flowchart showing the process used to select an element or element type, and an operation to perform on the selected element or element type.
Figure 15B:
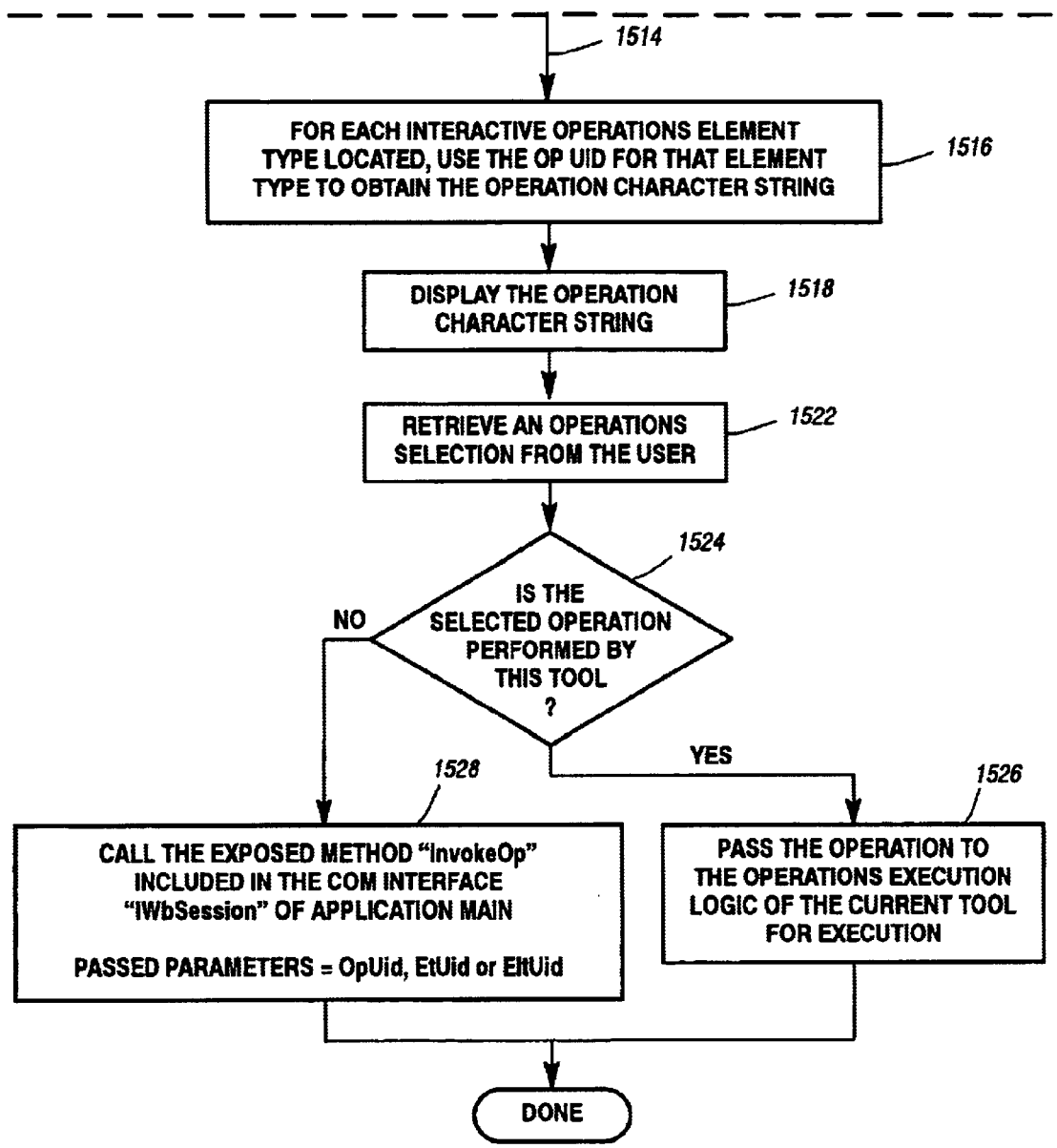

FIGS. 15A and 15B, when arranged as shown in FIG. 15, are a flowchart showing the process that may be performed by any of the tools to select an element or element type, and an operation to perform on the selected element or element type. In Step 1502, a tool's Selection Interface (shown as Selection Interface 1414 or 1416 of FIG. 14) is used to query the user for an element or element type. According to one embodiment of the invention, Selection Interface performs this query by initiating a call to the AIM EXE function "Get Elements" or "Get Element Types" using a parameter that specifies that either all elements or all element types are to be returned. According to another embodiment of the invention, this AIM EXE function may also be invoked to return just the elements or element types that are applicable to the currently-selected tool, if desired. For example, the selection interface associated with the Plan Wizard Tool 259 (of FIG. 2) may invoke this AIM EXE function to only return Plan elements or element types, since this tool is only operational for these types of elements.

After the call to the AIM EXE function is completed, the returned elements and element types are then displayed for the user, and the user is allowed to select from the displayed list. This selection could occur using any of the selection methods discussed above. This selection is retrieved from the user, as shown in Step 1504. If the selection is an element, the element type identifier (Element Type Uid) is read from the Element Inventory 102 for this element, as shown in Decisional Step 1506 and Step 1508. Using this Element Type Uid, all relationship types that are defined for that element type and that have the type attribute of "RelpKind" set to "Perform_on" are read from the EIS. As discussed above, this includes all of the relationship types having the requisite attribute designator that the selected element type inherits. For example, for the element type "Plans" shown in Block 840 of FIG. 8, the located relationship types will include not only those relationship types represented by Lines 842 and 844, and which are defined specifically for element type "Plans", but will also include relationship types having a type attribute of "RelpKind" set to "Perform_on" and which are defined for element type "Elements" in Block 602. These relationship types are exemplified by Lines 810–818, and by Lines 824, 826, 832, and 834 of FIG. 8. Locating these relationship types within the EIS is shown in Step 1510.

Next, each of the located relationship types is traversed, and the associated Interactive Operations element type is located, as shown in Step 1512. Processing continues to FIG. 15B as shown by Arrow 1514. In Step 1516, the Op Uid from each located element type is used to obtain a character string that identifies the associated operation. There are several ways to obtain this character string. According to one embodiment, the Op Uid is used to read from the Element Inventory 102 the one element that corresponds to the interactive operations element type. This corresponding element stores attribute information about the operation that is described by the Interactive Operations element type. One of these attribute fields includes a character string identifying the associated operation. For example, an attribute field included within an element instance of element type "Create Plan" may store the character string "CREATE A PLAN". Such a character string may be read from each retrieved one of the element instances and displayed to the user as a list of possible operations that may be performed on the selected element.

According to the preferred embodiment, the character string identifying the interactive operation is not retrieved from an element stored in the Element Inventory in the manner discussed above, but is instead obtained from a Resource File shown in FIG. 14 as Resource File 1432. This is accomplished using an index value stored in an attribute field within an element instance. The index value, also referred to as a "Resource ID", is used by a tool to read an associated character string from the Resource File to be displayed for the user. As is known in the art, the use of such resource files makes application code much more adaptable for use in a different language and/or culture. If an application is to be adapted for a different language, only the Resource File needs to be changed, which may be more readily accomplished than changing the contents of the Element Inventory, or by changing any code.

Also according to the preferred embodiment, the Resource IDs from each of the Interactive Operation element instances are stored in a Resource ID Table associated with each of the tools. The Resource ID Table for Tool A is shown as Resource ID Table 1433 and is initialized by the tool at tool initialization time. It includes an entry for each of the Op Uids, and further includes the Resource ID obtained from the element instance stored in the Element Inventory 102 that corresponds to each Op Uid. This table is used to access the Resource File 1432 to obtain the character strings to be displayed to the user. This allows the character strings to be displayed faster than if the Resource IDs were read from the Element Inventory. A similar table exists for Application Main, and is shown as Resource ID Table 1434.

Returning to the process of FIG. 15B, each of the character strings are displayed for the user in Step 1518, and the selected one of the character strings is retrieved from the user in Step 1522. The user can make this selection in any of the ways discussed above with respect to element or element type selections. A determination is then made as to whether the selected operation is an operation that is performed by the currently-selected tool. This may be done in a number of ways. The currently-selected tool may include a table of operations performed by the tool. This table is initialized using information obtained from the Element Inventory Schema 103 and the Element Inventory 102. A comparison is then made to determine if the selected operation matches an operation in this table. Alternatively, the selected Interactive Operations element type is used to locate an associated tool element type, which is then used to locate a related tool element instance in the Element Inventory. This tool element instance includes a unique tool identifier that is compared to the tool identifier of the current tool to make the determination as to whether the current tool performs the selected operation. The step of making this determination is shown as Decisional Step 1524.

If the selected operation is performed by the currently-active tool, the Operations Execution Logic for that tool executes the command on the selected element or element type, as shown in Step 1526. Otherwise, the selected operation is to be performed by a tool other than the currently-active tool. Therefor, the currently-active tool makes a call to the exposed method "InvokeOp" shown in Block 1423 of FIG. 14, which is included in the COM Interface "IWbSession" 1422 of Application Main 271. As parameters, this method is passed the Operations Uid, and the identifier for either the selected element type (Et Uid) or for the selected element (Elt Uid). This method call is shown in Step 1528.

Figure 16A:
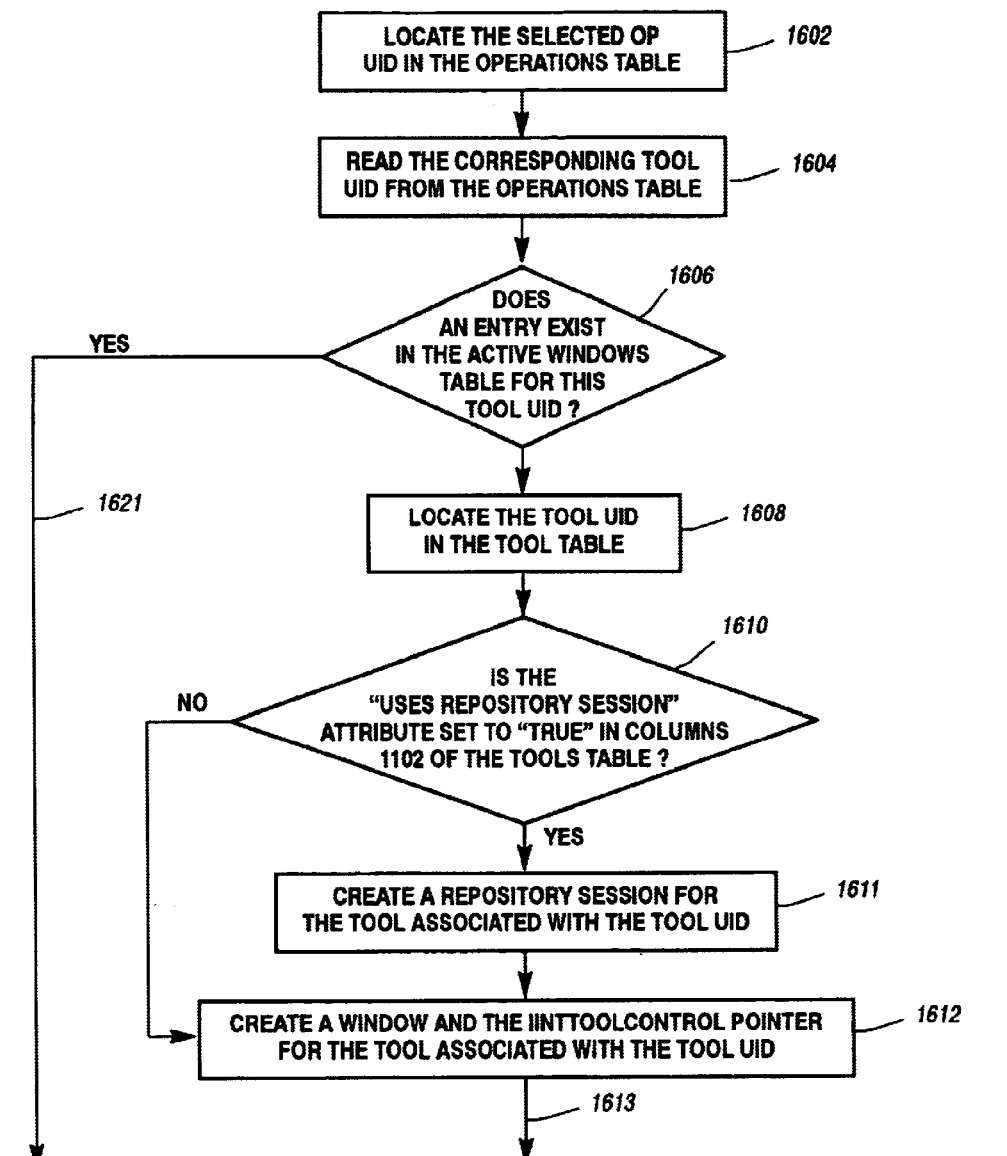
Figure 16B:
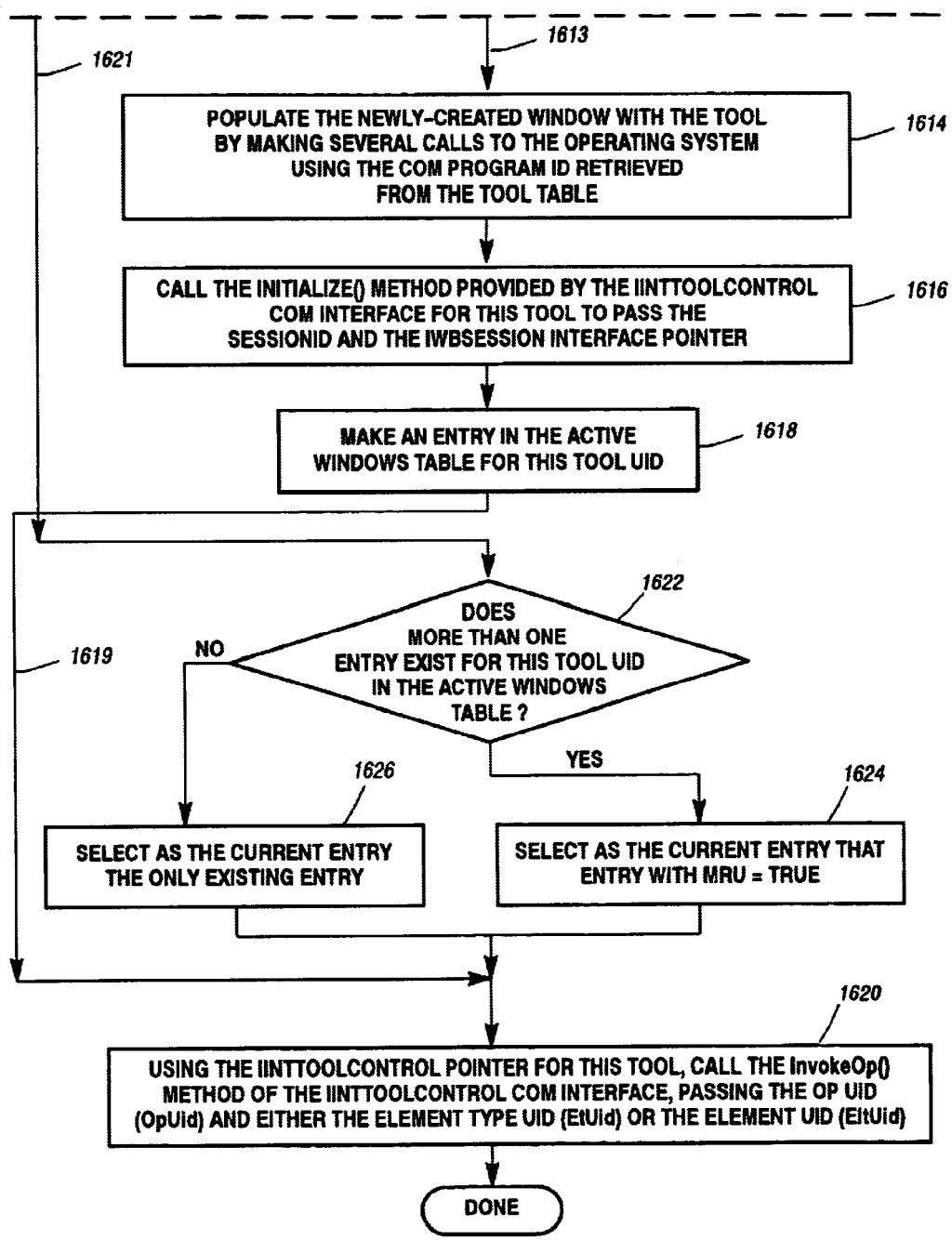

FIGS. 16A and 16B, when arranged as shown in FIG. 16, are a flowchart of the method used by Application Main to route operations between various ones of the Interactive Tools. When a call is made to exposed method "InvokeOp" of COM Interface "IWbSession" 1422, Application Main searches the Operations Table of FIG. 9 to locate the Op Uid, as shown in Step 1602. Recall that this identifier is passed as a parameter in the method call. Once located, the associated Tool Uid is read from Column 902 of the Operations Table for this table entry, as is illustrated in Step 1604.

Next, Column 1300 of the Active Window Table is searched to determine if an entry exists for the Tool Uid. This is indicated by Decision Step 1606. If no entry exists for this Tool Uid, Application Main starts an active window and launches the selected Interactive Tool. To accomplish this, Application Main 271 locates the Tool Uid in the Tool Table, as shown in Step 1608. If the attribute "Uses Repository Session" is set to true for this Tool Uid, Application Main creates a repository session for the tool using Session Controller 248. This is shown in Decision Step 1610 and 1611. Otherwise, processing continues immediately with Step 1612. In this Step 1612, Application Main creates a window and the IIntToolControl pointer for the tool. Processing continues to FIG. 16B, as shown by Arrow 1613. Application Main uses the "COM Program Id" attribute read from Columns 1102 of the Tool Table to make various operating system calls to populate the newly-created window with the tool, as illustrated in Step 1614.

After the window is populated, the Initialize( ) method provided by the tool's IIntToolControl COM Interface is called to pass the parameter "Sessionid" obtained when the Repository Session was created. This allows the tool to access the UREP Element Repository 220. This call also passes the IWbSession interface pointer for Application Main 271 to enable the tool to make program calls back to Application Main. This is shown in Step 1616. Application Main then adds an entry for this window to the Active Windows Table as shown in Step 1618, and processing continues as shown by Arrow 1619. Finally, Application Main calls the InvokeOp( ) method of the IIntToolControl COM interface for this tool, passing the Op Uid and the Element Type or Element identifier as parameters. This is displayed in Step 1620.

Returning to FIG. 16A, if it is determined in Decision Step 1606 that at least one entry exists in Active Windows Table for the current Tool Uid, processing continues with Decision Step 1622, as indicated by Arrow 1621. In this step, it is determined whether multiple entries exist in the Active Windows Table for the current Tool Uid. If multiple entries do exist, the entry with the MRU attribute in Column 1306 of the Active Windows Table that is set to "True" is selected, as shown in Step 1624. Otherwise, the single entry for the Tool Uid is selected as the current entry, as shown in Step 1626. The IIntToolControl Pointer from the current entry is then used to make the call to the appropriate tool's IIntToolControl COM Interface, passing the Op Uid and the Element or Element Type Uid, as shown in Step 1620.

Figure 17:
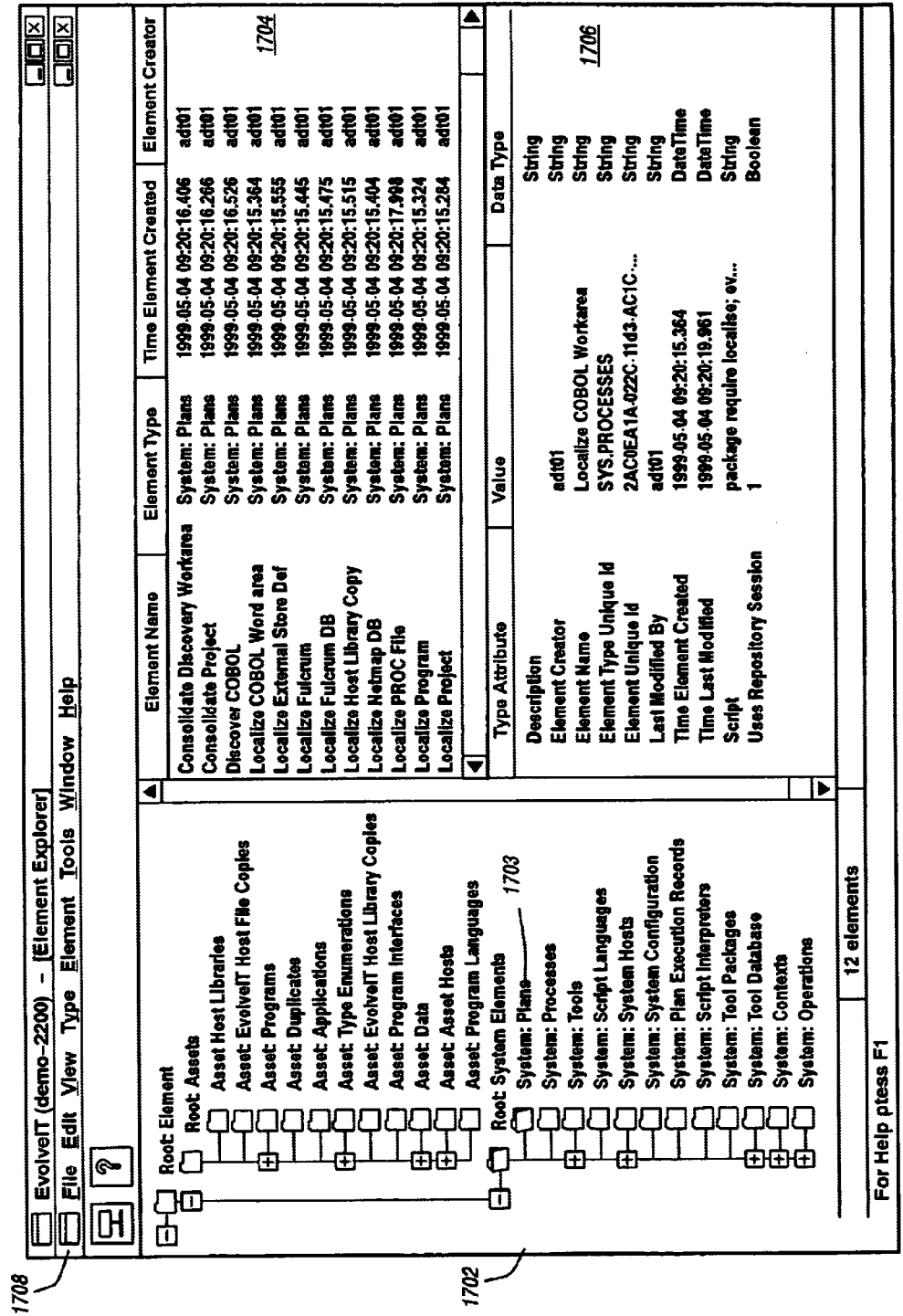
FIG. 17 is a diagram of a user interface screen provided by the Selection Interface for the Element Explorer tool of the preferred embodiment.

FIG. 17 is a diagram of a screen that is part of the Selection Interface for the Element Explorer of the preferred embodiment. As discussed above, Element Explorer is one of the Element Viewers 144 shown in FIG. 1. Window 1702 of FIG. 17 includes a listing of element types as read from EIS 103. These element types are read from the EIS using a "Get Element Types" call to the AIM EXE 232. The element type listing that is then provided is in a hierarchical format that reflects the hierarchical structure of element type definitions. This hierarchical structure is discussed above in reference to FIGS. 6 and 7. The element type hierarchy shown in Window 1702 may be expanded. This is done by first selecting an element type so that it appears highlighted, then initiating an "expand" function. In the preferred embodiment, an expand function is initiated using a point-and-click device to perform a "double click" operation on the selected element type as is known in the art. For example, in Window 1702, the element type "System: Tools" may be selected, then expanded to show all of the element types under "Tools" in the hierarchy. These element types are shown as those in Blocks 710–717 of FIG. 7.

When an element type is selected in Window 1702, Window 1704 shows all elements in the Element Inventory that are stored for that element type. For example, in the current example, element type "System: Plans" is selected in Window 1702, as shown in selection Block 1703. As a result, Window 1704 shows all of the elements stored in Element Inventory 102 of element type "System: Plans".

Using the element display in Window 1704, an element may be selected in any of the ways discussed above. Attributes stored within the selected element are then shown in Window 1706. In the current example, the element "Localize COBOL Work area" is selected in Window 1704, and the Attribute Fields for this element are shown in Window 1706. Both the name of the Attribute Field, the value stored in this Attribute Field, and the type of data that this Attribute Field stores is shown in Window 1706.

Once a user has selected either an element type in Window 1702, or has further selected an element in Window 1704, the user may initiate a "Get Operations" function. (If no element is selected in Window 1704, the "Get Operations" function will be performed for the element type selected in Window 1702.) In one embodiment, the "Get Operations" function may be selected by positioning a cursor over the element and or element type so that it is highlighted, then performing a "right-click" using a point-and-click device. This right-click operation causes the Selection Interface to provide a menu of operations that may be performed on the selected element or element type. This is accomplished according to Steps 1506–1518 of FIG. 15.

Figure 18:
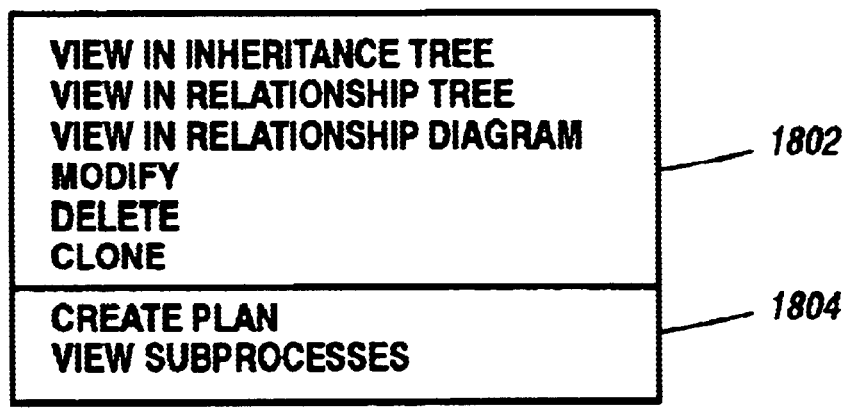
FIG. 18 is a display provided in response to initiation of a "Get Operations" function for a selected element.

FIG. 18 is a display provided in response to initiation of a "Get Operations" function for a selected element. This display shows all operations that may be performed on an element of type "Plan" as was shown selected in FIG. 17. According to the preferred embodiment, an operation may be distinguished from other operations in some manner if that operation is already being performed. In the current example of FIG. 18, the operation "View in Inheritance Tree" is displayed in a lighter text shown in Block 1802 because this operation is already being performed by Element Explorer in an active window. That is, in this example, Element Explorer is displaying an Inheritance Tree for the selected element in Window 1702 of FIG. 17. This window will still be active when the window including the display of FIG. 18 is presented to the user. Therefor, this function is indicated as already being active. Other indicators could be used to identify this active status, such as the use of a separate column or block within the display, or the use of different text font.

According to another aspect of the display of FIG. 18, some of the operations displayed are unique to the specific element selected. These operations are distinguished from the rest of the operations. For example, the operations shown in Block 1802 of FIG. 18 may be performed on elements other than those elements that are of type "Plans". However, those operations shown in Block 1804 may only be performed on elements of type "Plans", and thus these operations are distinguished from other operations by being displayed in a separate Block.

Figure 19:
FIG. 19 is a display provided in response to initiation of a "Get Operations" function for a selected element type.

FIG. 19 is a display provided in response to initiation of a "Get Operations" function for a selected element type. This type of display will be generated when a "Get Operations" function is initiated with an element type selected in Window 1702, but with no element selected in Window 1704. In a manner that is similar to that discussed above in reference to FIG. 18, operations that may be performed on any element type are shown in Block 1902, whereas other operations that may be performed only on this particular element type are shown in Block 1904.

The example of FIG. 19 further demonstrates the concept of overriding a more general operation with an operation that is specific to a particular element or element type. This concept is best explained by returning to FIG. 8. In FIG. 8A, the "Create Element" operations element is shown in Block 738 for the element type "Element" in Block 602. This operations element represents the create operation that is provided by Element Explorer to create an element or element type in the Element Inventory 102 or EIS 103. This create operation is a "generic" type of operation that may be used to create elements of almost any type. However, some elements are specialized and must be created using a specialized function provided by a specific tool. For example, in the preferred embodiment, elements of type "Plans" shown in Block 840 of FIG. 8, are a type of element that includes a developed script or script definition used to invoke a scripted tool. Plans can only be created using a special tool called a "Plan Wizard" shown in Block 716 of FIG. 8B. The creation of Plans is described in detail in the co-pending application entitled "A Process-Driven Tool Interface for an Object Management System", referenced above.

Because of the principal of inheritance, element type "Plans" is capable of forming all of the relationship types that the element types above element type "Plans" in the hierarchy are capable of forming. Thus, element type "Plans" inherits the capability to form all relationships that element type "elements" in Block 602 is capable of forming. It is evident, then, that element type "Plans" is capable of being related to two operation element types that describe "Create" operations. These operation element types are shown in Blocks 738 and 742. Since only one of these Create operations should be used to create an element of type "Plans", a decision process must be used. This decision is made by using the one relationship that is closest to the "Plans" element type and is either above, or at the level of the "Plans" element type in the hierarchy. In this example, the relationship represented by Line 844 that is associated with the "Create Plan" operation in Block 742 is at the level of the Plans element type in the hierarchy and is therefor used to determine that the Plan Wizard as represented by Block 716 will perform the Plan creation function.

The fact that operation overriding occurred for the creation function is indicated in FIG. 18 by the fact that the "Create Plan" operation is shown in a separate Window 1904 from the rest of the operations in the preferred embodiment of the invention. In a manner similar to that described with respect to FIG. 18, the use of this separate Window 1904 indicates that the included function and the manner in which it is accomplished is only associated with the selected element or element type.

The above description describes the aspect of the invention wherein a menu allowable operations is provided for a selected element or element type. The user selects one of these operations, which is routed to the appropriate tool for execution. According to another aspect of the invention, a "default" operation is associated with each element or element type. This default operation can be automatically invoked by positioning the cursor over an element or element type and performing a "default operation invocation mechanism" such as a certain keystroke sequence or point-and-click operation to cause the invocation of the default operation on the element or element type. In the preferred embodiment, this invocation is accomplished by highlighting the selected element or element type within the display window, as shown in FIG. 17, then performing a "double-click" operation using a point-and-click device. According to the preferred embodiment, the default operation is identified by attaching a type attribute to one of the relationship types that exists between an asset element type and an operations element type in the EIS 103. This type attribute identifies the relationship type as the default relationship type for that asset element type. For example, in FIG. 8B, the type attribute "DefaultOP" shown in Block 846 has a value set to "True" designating the relationship type illustrated by Line 842 as the default operations relationship type. This attribute causes a selected Plan element to undergo the operation "Execute" when the Plan element is selected and a "double-click" operation is performed.

Figure 20A:
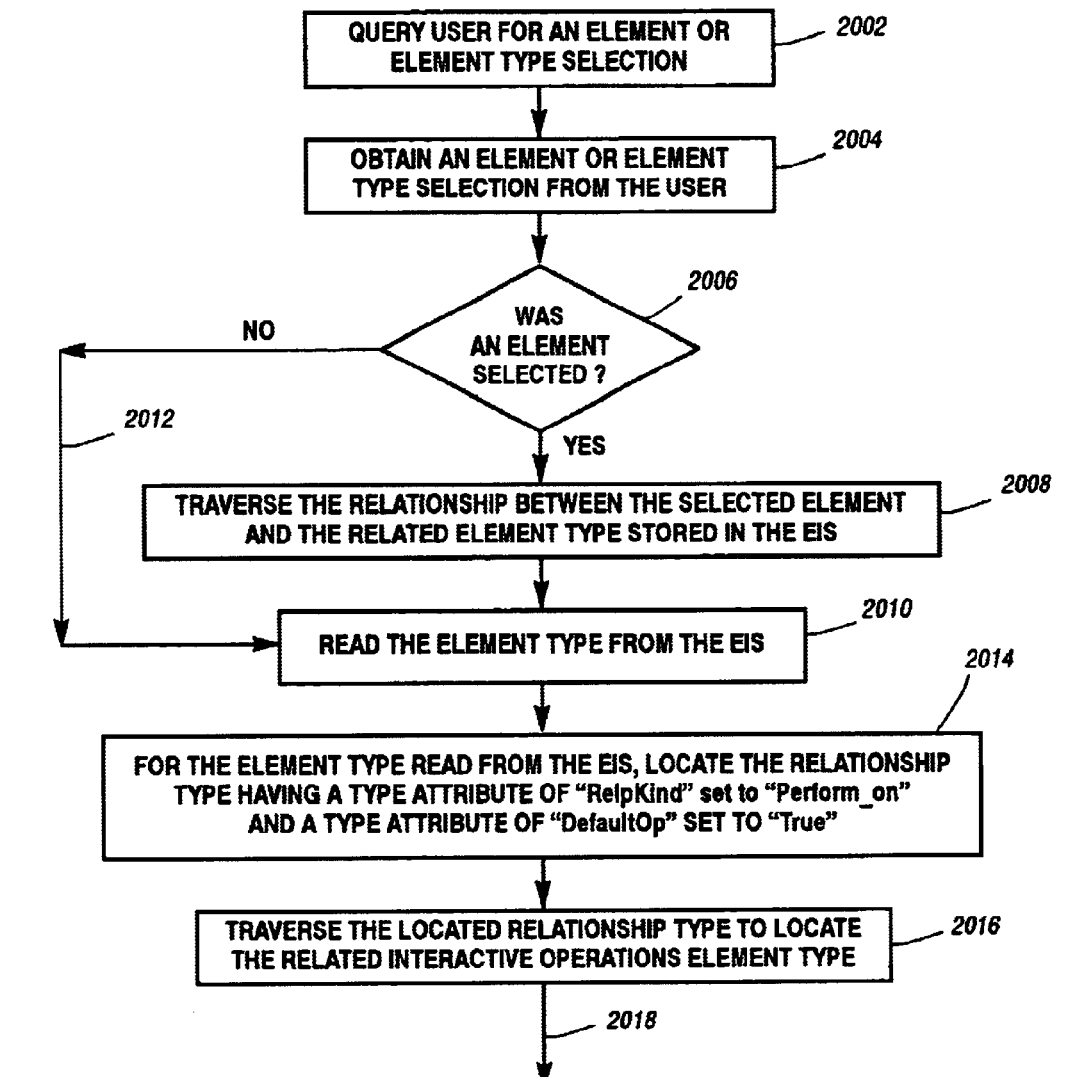
FIGS. 20A and 20B, when arranged as shown in FIG. 20, are a flowchart showing the process used to invoke a default operation for a selected element or element type.
Figure 20B:
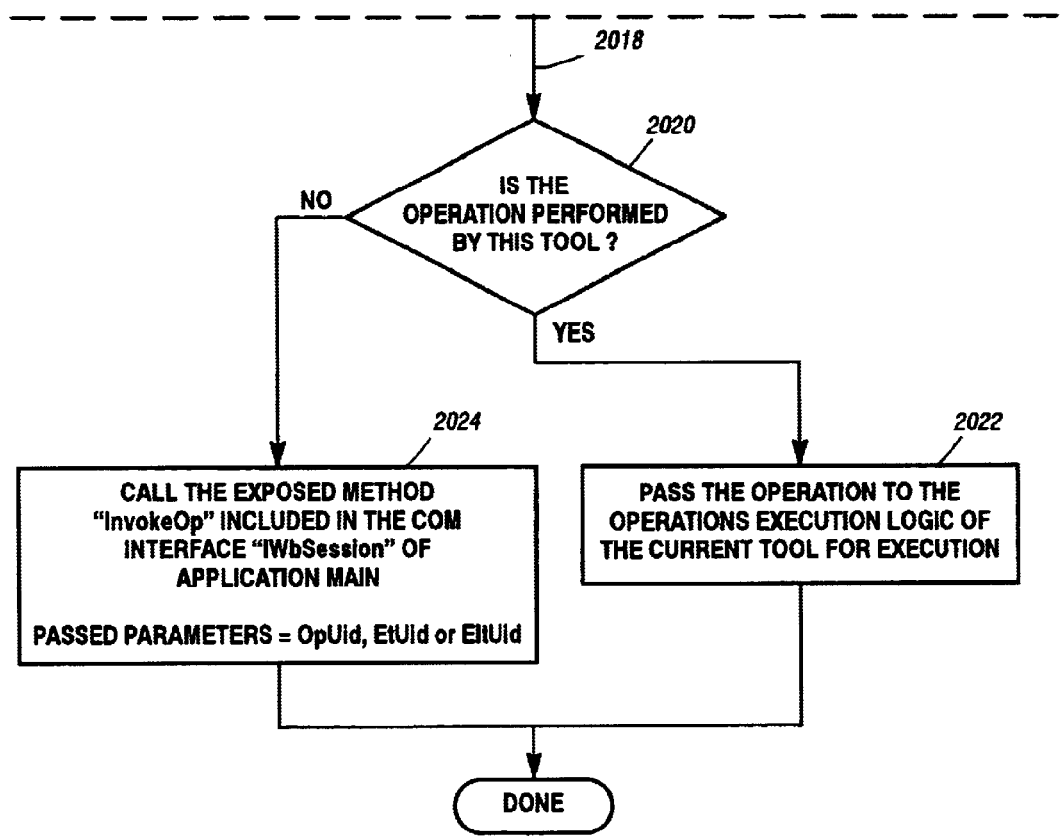

FIGS. 20A and 20B, when arranged as shown in FIG. 20, are a flowchart showing the process used to invoke a default operation for a selected element or element type. In Step 2002, the Selection Interface (shown as Selection Interface 1414 or 1416 of FIG. 14) is used to query the user for an element or element type. This is accomplished in the manner described above with respect to FIG. 15. Next, the element or element type selection is made, as may be done by positioning a highlighted cursor bar over the selected item, as is shown in FIG. 17. This is illustrated in Step 2004. If the selection is an element, the relationship existing between the selected element and the associated element type is traversed to locate the element type information from the EIS 103 as shown in Decisional Step 2006 and Step 2008. The located element type information is then read from EIS 103 as illustrated in Step 2010. If the user selects an element type instead of an element, the element type information is read immediately, as shown by Arrow 2012.

After an element type is read from the EIS 103, the relationship type having a type attribute "RelpKind" of "Perform_on" and further having a type attribute of "DefaultOp" set to "True" is read from the EIS, as shown in Step 2014. Next, the located relationship type is traversed, and the associated Interactive Operations element type is located, as shown in Step 2016. Processing continues to FIG. 20B, as shown by Arrow 2018. Next, a determination is made as to whether the selected operation is an operation that is performed by the currently-selected tool. This may be done in any number of ways, as discussed above in reference to FIG. 15. The step of making this determination is shown as Decisional Step 2020. If the selected operation is performed by the currently-selected tool, that tool executes the command on the selected element or element type, as shown in Step 2022. Otherwise, the selected operation is to be performed by a different tool. Therefor, the currently-selected tool makes a call to the exposed method "InvokeOp" shown in Block 1423 of FIG. 14, which is included in the COM Interface "IWbSession" 1422 of Application Main 271. As parameters, this method is passed the element identifier for the selected operations element (Op Uid), and the identifier for either the selected element type (Et Uid) or for the selected element (Elt Uid). This method call is shown in Step 2024. Application Main then routes the passed parameters to the correct Tool to be executed in a manner discussed above.

Having described an exemplary embodiment of the invention in the drawings and accompanying description, those skilled in the art will recognize that various modifications to the exemplary embodiment could be made without departing from the scope and spirit of the claims set forth below.

What is claimed is:

1. For use in a data processing system having a memory and an instruction processor coupled to the memory, the memory for storing data items and further for storing a set of tools, each of the tools in the set of tools for performing an associated set of operations on associated ones of the data items, a tool management system comprising:

a user interface coupled to the memory to allow a user to select any of the tools as the currently-selected tool, to select any of the data items as the currently-selected data item, and to select, for said currently-selected data item, an associated one of the operations to be executed as said currently-selected operation on said currently-selected data item;

selection means responsive to said user interface for determining whether said currently-selected operation is included in the associated set of operations performed by said currently-selected tool, and if said currently-selected operation is included in said associated set of operations performed by said currently-selected tool, for providing said currently-selected operation to said currently-selected tool for execution on said currently-selected data item; and a command routing interface responsive to said user interface to route a first indicator indicative of said currently-selected operation and a second indicator indicative of said currently-selected data item to a second one of the tools, said second one of the tools being the one of the tools including said currently-selected operation in its associated set of operations, whereby said second one of the tools executes said currently-selected operation on said currently-selected data item.

2. A tool management system, comprising:

a storage device to store groups of data signals and further to store software tools each for providing an associated set of operations on ones of said groups of data signals;

an instruction processor coupled to said storage device to execute each said set of operations provided by an associated one of said software tools;

a user interface coupled to said storage device to allow a user to select one of said software tools as a currently-selected tool, to allow the user to select one of said groups of data signals as a currently-selected group, and to allow the user to select from among predetermined ones of the operations in predetermined ones of said sets of operations that are associated with said selected group to choose a currently-selected operation;

selection interface means responsive to said user interface for determining if said currently-selected operation is included in the associated set of operations performed by said currently-selected tool, and if said currently-selected operation is included in said associated set of operations performed by said currently-selected tool, causing said instruction processor, under the control of said currently-selected tool, to execute said currently-selected operation on said currently-selected group; and routing interface means responsive to said selection interface means for providing an indication of said currently-selected operation to a second one of said software tools, said second one of said software tools being one of the software tools including said currently-selected operation in its associated set of operations, said routine interface means further for causing said instruction processor, under the control of said second one of said software tools, to execute said currently-selected operation on said currently-selected group.

3. The tool management system of claim 2, wherein said routing interface means includes means for causing said second one of said software tools to be selected as said currently-selected tool.

4. The tool management system of claim 3, wherein said user interface includes an interface responsive to said second one of said software tools, whereby following execution of said currently-selected operation, the user is allowed to select a different one of said groups of data signals as said currently-selected group, and is further allowed, based on said currently-selected group, to select from among predetermined ones of the operations in predetermined ones of said sets of operations that are associated with said currently-selected group to choose a new currently-selected operation.

5. The tool management system of claim 2, wherein said storage device includes circuits to store, for ones of said software tools, indicators indicating a respective default one of said associated set of operations, and wherein said user interface including a default selection interface to allow said respective default one of said associated set of operations to be selected for said currently-selected tool.

6. The tool management system of claim 2, wherein said storage device includes an object repository, and each of said groups of data signals are stored as an object in said object repository.

7. The tool management system of claim 6, wherein said object repository includes first circuits to designate ones of said objects as tool objects, each of said tool objects storing data signals describing a respective one of the software tools, and wherein said user interface includes means for reading each of said tool objects for use in allowing the user to select one of said software tools as said currently-selected tool.

8. The tool management system of claim 7, wherein said object repository includes second circuits to designate ones of said objects as operations objects, each of said operations objects storing data signals describing a respective one of said operations, and wherein said user interface includes means for reading predetermined ones of said operation objects for use in allowing the user to choose said currently-selected operation.

9. The tool management system of claim 8, wherein said object repository includes third circuits to designate first relationships, each of said first relationships associating a first respective object with a respective one of said operation objects, and wherein said user interface includes means for reading, as said predetermined ones of said operation objects, each operation object having one of said first relationships associating said each operation object with the object selected as said currently-selected group.

10. The tool management system of claim 9, wherein said object repository includes fourth circuits to designate second relationships, each of said second relationships associating a respective one of said operation objects with a respective one of said tool objects, and wherein said selection interface means includes means to select the one of said tool objects that is associated via one of said second relationships with the operations object representing said currently-select operation, and to further select for executing the currently-selected operation, the one of said tools that is represented by said selected tool object.

11. The tool management system of claim 6, wherein said object repository is model-driven such that each of said objects is created according to an object type defined by a model stored in said object repository.

12. The tool management system of claim 2, wherein said routing interface means includes means for determining whether said second one of said software tools is active, and if said second one of said software tools is not active, to launch said second one of said software tools.

13. The tool management system of claim 2, wherein said currently-selected operation is included within the associated set of operations of more than one of said tools, and further including operation override means coupled to said user interface for determining which one of said more than one of said tools should be used to provide the associated set of operations that is included among said predetermined ones of said sets of operations used to choose a currently-selected operation.

14. For use in a data processing system including a memory for storing data items, the memory further for storing tools that each performs an associated set of operations, each of the operations being associated with ones of the data items for performing data processing tasks on the associated ones of the data items, the computer-implemented method for managing the tools, comprising the steps of:

(a) selecting any of the tools as the currently-selected tool;

(b) using said currently-selected tool to obtain a list of the data items stored in the memory;

(c) selecting one of the data items as the currently-selected data item;

(d) using said currently-selected tool to obtain a list of all of the operations that are associated with said currently-selected data item;

(e) selecting one of the listed operations as the currently-selected operation;

(f) using said currently-selected tool to perform said currently-selected operation if said currently-selected operation is included in the associated set of operations performed by said currently-selected tool; and (g) routing said currently-selected operation to a different one of the tools to be performed if said currently-selected operation is not included in the associated set of operations performed by said currently-selected tool, wherein said currently-selected operation is included in the associated set of operations performed by said different one of the tools for said currently-selected data item.

15. The method of claim 14, wherein step (g) includes the step of launching said different one of the tools if said different one of the tools is not currently active.

16. The method of claim 14, wherein the data processing system allows multiple ones of the tools to be active simultaneously, each in a respective window, and wherein step (a) includes the step of selecting a window, whereby said currently-selected tool is the tool populating the currently-selected window.

17. The method of claim 14, wherein the memory includes an object repository for storing objects, and wherein each of the data items is one of the objects stored in the object repository, and wherein step (b) includes the step of retrieving a list of predetermined ones of the objects stored in the object repository for use in selecting a selected object as said currently-selected data item.

18. The method of claim 17, wherein the object repository stores objects that are designated as tool objects, each of the tool objects storing data signals representing and describing a respective one of the tools, and wherein step (a) includes the steps of:

retrieving from the object repository each of the tool objects; and using data signals stored in the retrieved tool objects to build a tools menu for use in selecting one of the tools as said currently-selected tool.

19. The method of claim 18, wherein the object repository stores objects that are designated as operations objects, each of the operations objects storing data signals representing and describing a respective one of the operations in the object repository, and wherein step (e) includes the steps of:

(e1) retrieving predetermined ones of the operations objects stored in the object repository; and (e2) using data signals read from retrieved ones of the operations objects to build an operations menu for use in selecting one of the operations as said currently-selected operation.

20. The method of claim 19, wherein the data processing system further includes a resource file for storing language-specific information describing the operations, and wherein step (e2) includes the steps of:

reading a resource index from each of said retrieved ones of the operations objects; and using each said resource index to read language specific information from the resource file for use in building said operations menu.

21. The method of claim 20, wherein the object repository further stores operation relationship indicators each to indicate a relationship existing between a respective one of said operation objects and other ones of the objects stored in the object repository, and wherein step (e) includes the step of retrieving as said list of predetermined ones of the operations all of said operation objects indicated as having a relationship to said selected object.

22. The method of claim 21, wherein the object repository further stores tool relationship indicators each to indicate a relationship existing between a respective one of the operation objects and a respective one of the tool objects, and wherein step (f) includes the step of determining whether said currently-selected operation is included in said associated set of operations performed by said currently-selected tool by determining whether the one of the operations objects representing said currently-selected operation is related to the one of the tool objects representing the currently-selected tool.

23. The method of claim 14 wherein ones of the tools are each associated with a default one of the operations, and further including the step of allowing the default one of the operations for said currently-selected tool to be selected using a predetermined default selection mechanism.

24. The method of claim 18, wherein the object repository stores objects that are designated as operations objects, each of the operations objects storing data signals representing and describing a respective one of the operations in the object repository, and wherein step (e) includes the steps of:

(e1) retrieving predetermined ones of the operations objects stored in the object repository; and (e2) using data signals read from retrieved ones of the operations objects to build an operations menu for use in selecting one of the operations as said currently-selected operation.

25. The method of claim 14 wherein multiple ones of the operations that are associated with said currently-selected data item are available for performing similar ones of the data processing tasks and are associated with said currently-selected data item, and wherein step (e1) includes the step of selecting the one of said multiple ones of the operations that is most specifically designed to process said currently-selected data item.

26. For use in a data management system having an instruction processor, a memory coupled to the instruction processor, and a repository to store data items managed by the data management system, wherein the memory stores a tool set for providing a predetermined set of functions to be executed by the instruction processor, the tool set including multiple tools each for providing respective ones of functions, and wherein each data item is associated with the ones of the functions capable of being performed on the data item, a tool management system, comprising:

first memory circuits to store, for each of the functions, an associated function description, and function relationship indicators that each associates the function description with a data item that is associated with the function;

second memory circuits coupled to the first memory circuits to store, for each of the tools, a tool description, and tool relationship indicators that each associates the tool description with a function description that describes a function performed by the tool;

selection means coupled to the first memory circuits for allowing for the selection of a data item and a tool, and for searching the repository to find the selected data item;

relationship traversal means for utilizing the function relationship indicators to locate each of the function descriptions associated with the selected data item;

command routing means for receiving functions from the selection means; and wherein the selection means further includes means for allowing one of the located functional descriptions to be selected, and means for invoking the selected tool to execute the function described by the selected function description if the described function is provided by the selected tool, and otherwise, for providing the described function to the command routing means.

27. The system of claim 26, wherein said command routing means includes means for utilizing the tool relationship indicators to locate a tool description describing a tool that performs the described function, and for utilizing the located tool description to invoke the described tool to execute the described function.

\* \* \* \* \*